United States Patent
Emerson et al.

(10) Patent No.: US 7,518,614 B2
(45) Date of Patent: Apr. 14, 2009

(54) METHOD AND APPARATUS FOR CAPTURING AND TRANSMITTING SCREEN IMAGES

(75) Inventors: Theodore F. Emerson, Tomball, TX (US); Robert L. Noonan, Crystal Lake, IL (US); David F. Heinrich, Tomball, TX (US); Don Dykes, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 11/210,082

(22) Filed: Aug. 23, 2005

(65) Prior Publication Data

US 2006/0039468 A1     Feb. 23, 2006

Related U.S. Application Data

(60) Provisional application No. 60/603,796, filed on Aug. 23, 2004.

(51) Int. Cl.
  *G06T 15/00* (2006.01)
(52) U.S. Cl. .................. 345/502; 710/106; 710/302; 709/209; 709/212
(58) Field of Classification Search ................. 345/502; 710/106, 302; 709/219, 222
  See application file for complete search history.

(56) References Cited

U.S. PATENT DOCUMENTS

| | | | |
|---|---|---|---|
| 4,494,232 A | 1/1985 | Dambrackas et al. | ......... 370/80 |
| 4,593,399 A | 6/1986 | Baugh et al. | ................ 375/104 |
| 4,942,606 A | 7/1990 | Kaiser et al. | |
| 5,062,059 A | 10/1991 | Youngblood et al. | |
| 5,072,409 A | 12/1991 | Bottorf et al. | |
| 5,101,492 A | 3/1992 | Schultz et al. | |
| 5,122,875 A * | 6/1992 | Raychaudhuri et al. | .. 348/390.1 |
| 5,249,279 A | 9/1993 | Schmenk et al. | |
| 5,257,384 A | 10/1993 | Farrand et al. | |
| 5,272,382 A | 12/1993 | Heald et al. | |
| 5,283,905 A | 2/1994 | Saadeh et al. | |

(Continued)

FOREIGN PATENT DOCUMENTS

DE          69222697 T2     10/1997

(Continued)

OTHER PUBLICATIONS

Briggs, Chris; "Smarter and Faster I/O for Servers"; CORE: Operating Systems; *Byte*, May 1, 1996, vol. 2, No. 5.

(Continued)

*Primary Examiner*—Phu K Nguyen

(57) ABSTRACT

A remote management controller may include a video redirection device and a processor. The video redirection device may be configured to: obtain multiple separate slices of video data output from a video graphics controller; calculate at least one value correlative to each of the multiple separate slices of video data; and if the calculated value for any portion of any of the multiple separate slices differs from a value for a previously obtained corresponding portion, update a table associated with an image related to a remote system with the calculated value, process the portion of the slice into a network packet, and move the network packet to one of multiple network buffers. The processor may be configured to: allocate the multiple network buffers; and facilitate transmission of the network packets loaded into the network buffers to the remote system.

32 Claims, 19 Drawing Sheets

U.S. PATENT DOCUMENTS

| | | |
|---|---|---|
| 5,309,563 A | 5/1994 | Farrand et al. |
| 5,331,646 A | 7/1994 | Krueger et al. |
| 5,333,305 A | 7/1994 | Neufeld |
| 5,363,483 A | 11/1994 | Jones et al. |
| 5,367,641 A | 11/1994 | Pressprich et al. |
| 5,367,670 A | 11/1994 | Ward et al. |
| 5,390,324 A | 2/1995 | Burckhartt et al. |
| 5,402,431 A | 3/1995 | Saadeh et al. |
| 5,410,706 A | 4/1995 | Farrand et al. |
| 5,428,671 A | 6/1995 | Dykes et al. |
| 5,440,699 A | 8/1995 | Farrand et al. |
| 5,440,716 A | 8/1995 | Schultz et al. |
| 5,444,849 A | 8/1995 | Farrand et al. |
| 5,522,065 A | 5/1996 | Neufeld |
| 5,537,540 A | 7/1996 | Miller et al. |
| 5,548,730 A | 8/1996 | Young et al. |
| 5,574,864 A | 11/1996 | Emerson et al. |
| 5,592,648 A | 1/1997 | Schultz et al. |
| 5,592,676 A | 1/1997 | Bonnafoux |
| 5,596,711 A | 1/1997 | Burckhartt et al. |
| 5,608,426 A | 3/1997 | Hester |
| 5,627,962 A | 5/1997 | Goodrum et al. |
| 5,668,971 A | 9/1997 | Neufeld |
| 5,734,847 A | 3/1998 | Garbus et al. |
| 5,764,886 A | 6/1998 | Danielson et al. |
| 5,790,895 A | 8/1998 | Krontz et al. |
| 5,812,144 A | 9/1998 | Potu et al. |
| 5,848,249 A | 12/1998 | Garbus et al. |
| 5,852,720 A | 12/1998 | Gready et al. |
| 5,857,074 A | 1/1999 | Johnson |
| 5,864,653 A | 1/1999 | Tavallaei et al. |
| 5,864,710 A | 1/1999 | Sands et al. |
| 5,898,861 A | 4/1999 | Emerson et al. |
| 5,909,691 A | 6/1999 | Schultz et al. |
| 5,933,614 A | 8/1999 | Tavallaei et al. |
| 5,940,627 A | 8/1999 | Luciani et al. |
| 5,948,090 A | 9/1999 | Heinrich et al. |
| 5,956,475 A | 9/1999 | Burckhartt et al. |
| 5,956,487 A | 9/1999 | Venkatraman et al. |
| 5,961,617 A | 10/1999 | Tsang |
| 5,970,149 A | 10/1999 | Johnson |
| 5,974,438 A | 10/1999 | Neufeld |
| 5,982,392 A | 11/1999 | Anfossi et al. |
| 5,993,614 A | 11/1999 | Nomura |
| 6,003,097 A | 12/1999 | Richman et al. |
| 6,067,527 A | 5/2000 | Lovell et al. |
| 6,070,253 A | 5/2000 | Tavallaei et al. |
| 6,081,865 A | 6/2000 | Tavallaei et al. |
| 6,088,706 A | 7/2000 | Hild |
| 6,098,143 A | 8/2000 | Humpherys et al. |
| 6,101,617 A | 8/2000 | Burckhartt et al. |
| 6,112,235 A | 8/2000 | Spofford |
| 6,122,216 A | 9/2000 | Dykes |
| 6,128,690 A | 10/2000 | Purcell et al. |
| 6,134,613 A | 10/2000 | Stephenson et al. |
| 6,139,177 A | 10/2000 | Venkatraman et al. |
| 6,141,708 A | 10/2000 | Tavallaei et al. |
| 6,167,448 A | 12/2000 | Hemphill et al. |
| 6,167,538 A | 12/2000 | Neufeld et al. |
| 6,170,007 B1 | 1/2001 | Venkatraman et al. |
| 6,170,021 B1 | 1/2001 | Graff |
| 6,173,340 B1 | 1/2001 | Gready et al. |
| 6,173,341 B1 | 1/2001 | Emerson et al. |
| 6,177,808 B1 | 1/2001 | Heinrich et al. |
| 6,185,628 B1 | 2/2001 | Sands et al. |
| 6,195,389 B1 | 2/2001 | Rodriguez et al. |
| 6,199,167 B1 | 3/2001 | Heinrich et al. |
| 6,205,466 B1 | 3/2001 | Karp et al. |
| 6,212,587 B1 | 4/2001 | Emerson et al. |
| 6,226,699 B1 | 5/2001 | Humpherys et al. |
| 6,233,634 B1 | 5/2001 | Clark et al. |
| 6,249,830 B1 | 6/2001 | Mayer et al. |
| 6,263,395 B1 | 7/2001 | Ferguson et al. |
| 6,310,782 B1 | 10/2001 | Noonan et al. |
| 6,317,798 B1 | 11/2001 | Graf |
| 6,321,287 B1 | 11/2001 | Rao et al. |
| 6,343,313 B1 | 1/2002 | Salesky et al. |
| 6,370,649 B1 | 4/2002 | Angelo et al. |
| 6,385,682 B1 | 5/2002 | Emerson et al. |
| 6,388,675 B1 | 5/2002 | Kamada et al. |
| 6,401,157 B1 | 6/2002 | Nguyen et al. |
| 6,434,615 B1 | 8/2002 | Dinh et al. |
| 6,442,631 B1 | 8/2002 | Neufeld et al. |
| 6,460,139 B1 | 10/2002 | Heinrich et al. |
| 6,470,339 B1 | 10/2002 | Karp et al. |
| 6,473,795 B1 | 10/2002 | Danielson et al. |
| 6,476,854 B1 | 11/2002 | Emerson et al. |
| 6,483,502 B2 | 11/2002 | Fujiwara |
| 6,487,623 B1 | 11/2002 | Emerson et al. |
| 6,496,904 B1 | 12/2002 | Noonan |
| 6,505,268 B1 | 1/2003 | Schultz et al. |
| 6,510,522 B1 | 1/2003 | Heinrich et al. |
| 6,522,334 B2 | 2/2003 | Schauser |
| 6,529,936 B1 | 3/2003 | Mayo et al. |
| 6,542,995 B2 | 4/2003 | Heinrich et al. |
| 6,549,420 B2 | 4/2003 | Noonan et al. |
| 6,556,208 B1 | 4/2003 | Congdon et al. |
| 6,567,901 B1 | 5/2003 | Neufeld |
| 6,571,388 B1 | 5/2003 | Venkatraman et al. |
| 6,631,476 B1 * | 10/2003 | Vandesteeg et al. ............ 714/4 |
| 6,633,905 B1 | 10/2003 | Anderson et al. |
| 6,636,929 B1 | 10/2003 | Frantz et al. |
| 6,664,969 B1 | 12/2003 | Emerson et al. |
| 6,671,343 B1 | 12/2003 | Ito |
| 6,728,808 B1 | 4/2004 | Brown |
| 6,742,066 B2 | 5/2004 | Emerson et al. |
| 6,757,585 B2 | 6/2004 | Ohtsuki et al. |
| 6,757,725 B1 | 6/2004 | Frantz et al. |
| 6,774,904 B2 | 8/2004 | Emerson et al. |
| 6,795,894 B1 | 9/2004 | Neufeld et al. |
| 6,799,225 B2 | 9/2004 | Sands et al. |
| 6,819,322 B2 | 11/2004 | Emerson et al. |
| 6,851,008 B2 | 2/2005 | Hao |
| 6,857,040 B2 | 2/2005 | Noonan et al. |
| 6,859,876 B2 | 2/2005 | Dykes et al. |
| 6,904,495 B2 | 6/2005 | Frantz et al. |
| 7,133,947 B2 * | 11/2006 | Tomitsuka et al. .......... 710/106 |
| 7,343,541 B2 * | 3/2008 | Oren ......................... 714/758 |
| 2001/0010625 A1 | 8/2001 | Noonan et al. |
| 2001/0034778 A1 | 10/2001 | Venkatraman et al. |
| 2001/0034781 A1 | 10/2001 | Venkatraman et al. |
| 2001/0037414 A1 | 11/2001 | Sands et al. |
| 2001/0044836 A1 | 11/2001 | Venkatraman et al. |
| 2002/0032785 A1 | 3/2002 | Britt, Jr. |
| 2002/0067429 A1 | 6/2002 | Nason et al. |
| 2002/0087855 A1 | 7/2002 | Dykes et al. |
| 2002/0091850 A1 | 7/2002 | Perholtz et al. |
| 2002/0099885 A1 | 7/2002 | Emerson et al. |
| 2002/0099886 A1 | 7/2002 | Emerson et al. |
| 2002/0129186 A1 | 9/2002 | Emerson et al. |
| 2002/0133636 A1 | 9/2002 | Venkatraman et al. |
| 2002/0194486 A1 | 12/2002 | Heinrich et al. |
| 2003/0063742 A1 | 4/2003 | Neufeld et al. |
| 2003/0064731 A1 | 4/2003 | Angelo et al. |
| 2003/0065935 A1 | 4/2003 | Neufeld |
| 2003/0105876 A1 | 6/2003 | Angelo et al. |
| 2003/0105910 A1 | 6/2003 | Noonan et al. |
| 2003/0126391 A1 | 7/2003 | Neufeld et al. |
| 2003/0128843 A1 | 7/2003 | Brown et al. |
| 2003/0131065 A1 | 7/2003 | Neufeld et al. |
| 2003/0131113 A1 | 7/2003 | Reeves et al. |
| 2003/0131119 A1 | 7/2003 | Noonan et al. |
| 2003/0131136 A1 | 7/2003 | Emerson et al. |
| 2003/0131137 A1 | 7/2003 | Chosnek et al. |

| | | | |
|---|---|---|---|
| 2003/0131189 A1 | 7/2003 | Frantz et al. | |
| 2003/0131246 A1 | 7/2003 | Reeves et al. | |
| 2003/0131257 A1 | 7/2003 | Frantz et al. | |
| 2003/0140291 A1 | 7/2003 | Brown et al. | |
| 2003/0142111 A1 | 7/2003 | Emerson et al. | |
| 2003/0149796 A1 | 8/2003 | Emerson et al. | |
| 2003/0169264 A1 | 9/2003 | Emerson et al. | |
| 2003/0179206 A1 | 9/2003 | Emerson et al. | |
| 2003/0182551 A1 | 9/2003 | Frantz et al. | |
| 2003/0204633 A1 | 10/2003 | Dykes et al. | |
| 2003/0208558 A1 | 11/2003 | Venkatraman et al. | |
| 2003/0208650 A1 | 11/2003 | Depew et al. | |
| 2003/0208654 A1 | 11/2003 | Krontz et al. | |
| 2003/0220999 A1 | 11/2003 | Emerson | 709/224 |
| 2003/0226015 A1 | 12/2003 | Neufeld et al. | 716/166 |
| 2003/0233556 A1 | 12/2003 | Angelo et al. | 713/186 |
| 2004/0002877 A1 | 1/2004 | Angelo et al. | 705/7 |
| 2004/0042547 A1 | 3/2004 | Coleman | |
| 2004/0062305 A1 | 4/2004 | Dambrackas | 375/240.01 |
| 2004/0153723 A1 | 8/2004 | Depew et al. | 714/6 |
| 2004/0162893 A1 | 8/2004 | Brown et al. | 709/222 |
| 2004/0183567 A1 | 9/2004 | Engler et al. | 326/34 |
| 2004/0261104 A1 | 12/2004 | Gordon et al. | |
| 2005/0027987 A1 | 2/2005 | Neufeld et al. | 713/176 |
| 2005/0060468 A1 | 3/2005 | Emerson et al. | 710/305 |
| 2005/0060541 A1 | 3/2005 | Angelo et al. | 713/165 |
| 2005/0069034 A1 | 3/2005 | Dambrackas | 375/240.01 |
| 2005/0104852 A1 | 5/2005 | Emerson et al. | 345/157 |
| 2005/0125506 A1 | 6/2005 | Luciani, Jr. et al. | 709/219 |
| 2005/0125648 A1 | 6/2005 | Luciani, Jr. et al. | 713/1 |

FOREIGN PATENT DOCUMENTS

| | | |
|---|---|---|
| DE | 69223090 T2 | 12/1997 |
| DE | 69224775 T2 | 3/1998 |
| DE | 69230306 T2 | 11/1999 |
| DE | 69231391 T2 | 8/2000 |
| DE | 69718859 T2 | 2/2003 |
| DE | 69719420 T2 | 3/2003 |
| DE | 69231391 T2 | 8/2008 |
| EP | 0520766 A2 | 12/1992 |
| EP | 0520768 A2 | 12/1992 |
| EP | 0520769 A2 | 12/1992 |
| EP | 0520770 A2 | 12/1992 |
| EP | 0532249 B1 | 3/1993 |
| EP | 0825535 A2 | 2/1998 |
| EP | 0825749 A2 | 2/1998 |
| EP | 0855536 A2 | 2/1998 |
| EP | 0837387 A2 | 4/1998 |
| EP | 0838768 B1 | 4/1998 |
| EP | 0847008 A2 | 6/1998 |
| EP | 0851363 A2 | 7/1998 |
| JP | 2135978 | 5/1990 |
| JP | 5250284 | 9/1993 |
| JP | 3410748 B2 | 10/1993 |
| JP | 3410748 B2 | 10/1993 |
| JP | 7-8771 B2 | 8/1995 |
| JP | 7-78771 B2 | 8/1995 |
| JP | 10-105486 A | 4/1998 |
| JP | 10-116254 A | 5/1998 |
| JP | 10-116255 A | 5/1998 |
| JP | 10-187589 A | 7/1998 |
| JP | 10-241089 A | 9/1998 |
| JP | 10-254806 A | 9/1998 |
| JP | 10-334043 A | 12/1998 |
| WO | WO 00/58831 A2 | 10/2000 |

OTHER PUBLICATIONS

Emerson, et al., Video Eavesdropping and Reverse Assembly to Transmit Video Action to a Remote Console, U.S. Appl. No. 08/733,254, filed Oct. 18, 1996.
Amdahl, Carlton G.; "I₂O Future Directions"; http:/www.i2osig.org; Jun. 1996; 12 pages.
Goble, Scott, et al.; "Intelligent I/O Architecture"; http://www.i2osig.org; Jun. 1996; 22 pages.
"Remote Server Management with Integrated Remote Console," Compaq Computer Corporation Technology Brief, Oct. 21, 1996.
Thompson, Tom; "I₂O Beats I/O Bottlenecks"; *Byte*, Aug. 1997, pp. 85, 86 and 3 additional pages.
Mendel, Brett; "Server I/O all set to flow"; *Lantimes*, Oct. 27, 1997, vol. 14, Issues 22; cover page and p. 31.
I₂O Introduction; Technology Background; Aug. 13, 1997; http://www.i2osig.org/Architecture/TechBack/html.
Crothers, Brooke; "Intel server chip gets bick backing"; Oct. 7, 1997; http://www.news.com/News/Item/0,4,14962,00.html; Feb. 6, 1998.
"HP Demonstrates Commitment to I₂O Standard with new I20 Disk-array Controller"; *Hewlett Packard*; Press Release, Atlanta, Oct. 8, 1997.
i960®RP I/O Processor—the I2O ISG sit; http://134.134.214.1/design/iio/i20sig.html; Feb. 6, 1998.
"I₂O Technology Backgrounder"; http://www.i2osig.org/Architecture/TechBack.html; Feb. 6, 1998; 6 pages.
Questions and Answers; http://www.i2osig.org/Architecture/QandA.html; Feb. 6, 1998; 4 pages.
"I₂O® Specification for Non-Members"; http://www.i2osig.org/Architecture/GetSpec.html; Feb. 6, 1998.
"I₂O Press Releases & Clips"; http://www.i2osig.org/Press; Feb. 6, 1998; 4 pages.
"I₂O: Disaster in the making for the freeware community"; http://22.kenandted.com/i20/disaster.html; Feb. 6, 1998, 2 pages.
Focus Enhancements—Press Release; "Bill Dambrackas joins FOCUS Enhancements' Board of Directors", Apr. 19, 1999.
"Compaq Remote System Management for Industry-Standard Servers," Compaq Computer Corporation Technology Brief, Sep. 2001.
Panjwani, Pradeep K.; "Monitoring and Compression Framework in Virtual Machine Interface 2.0"; Thesis—University of Illinois at Urbana-Champaign, 2002.
HP Success Story—Media Temple Inc.; ProLiant Servers; 4 pages (2002).
GRID Today; Breaking News—Platforms: "HP Reduces Server Administration Costs With Lights-Out"; Jul. 22, 2002; 2 pages.
Comrac Data Centre—Solutions & Services; "DSView 3.1"; http://kbm.comrac.co.uk.main.asp?pid + 178&rnd=5860 . . . ; 4 pages (2003).
Allied Telesyn—Accelerator Cards; AT-AR011i & AT-AR061, Encryption/Compression Cards Brochure (2003).
Generel DataComm; "Your Network is our Business—Application Solution for Enterprise Network Operators"; http://www/gdc.com/solutions/enterprisesolutions1.shtml; 5 pages (2003).
NetworkWorld; Research Center: Network/Systems Mgmt, "Riding herd on desktop demands"; http://www.networkworld.com/reviews/2003/0210bgtrends.htm; 3 pages, Feb. 10, 2003.
Insight—White Papers; "Best Practices for Integrated Lights-Out from Hewlett Packard"; 2nd Edition, 33 pages, Jun. 1, 2003.
Small Business Computing.com; "Remove Access Resolves SMB Computing Concerns"; http://www.smallbusinesscomputing.com/webmaster/article.php/3065491 . . . 3 pages; Aug. 19, 2003.
PR Newswire, News & Information; "Quipp Elects William A. Dambrackas and Robert C. Strandberg to Board of Directors"; 2 pages, Oct. 12, 2003.
Digi-Know, Engineering Data Products; "Avocent Dambrackas Video Compression Option"; Dec. 12, 2003, Issue 14, vol. 3; http://www.edp-usa.com/digiknow/121203dk.gif; 1 page.
Peppercon, "KVM IP Extender Peppercon LARA express"; http://www.peppercon.com/index.php?id=374 . . . ; copyright 2004.
Radware; "LinkProof Branch—Remote Office Connection"; http://www.radware.com/content/products/1pb/defaults.asp; 3 pages; copyright 2004.
Hewlett-Packard; "Advantages and Implementation of HP Remote Graphics Software White Paper"; 8 pages; copyright 2004.
Intel Management Module—Advanced Edition—White Paper; Empowering Remote Management with Embedded KVM; 6 pages; copyright 2004.
Avocent—Branch Offices Brochure; "Discover the KVM of IP remote access solution every branch office needs"; 2 pages; copyright 2004.

Avocent—IT Infrastructure Brochure; "Discover DSView 3 software benefits for your branch offices and data centres"; 2 pages; copyright 2004.

HP Integrated Lights-Out technology keeps lights on in United Kingdom—Scottish and Southern Energy plc; HP ProLiant Essential Rapid Deployment Pack; 4 pages (2004).

AusCERT (Australian Computer Emergency Response Team) ESB-2004.0367—HP Security Bulletin SSRT4724—HP integrated Lights Out (iLO) Denial of Service (DoS) using port zero; http://www.auscert.org.au/render.html?it=430 . . . 4 pages; May 26, 2004.

Insight—White Papers; "HP Integrated Lights-Out Security Technology Brief"; 39 pages; Jul. 1, 2004.

Cisco 7945-H1 Media Convergence Server: Data Sheet; http://www.cisco.com/en/US/products/hw/voiceapp/ps378/products . . . 9 pages (1992-2005).

* cited by examiner

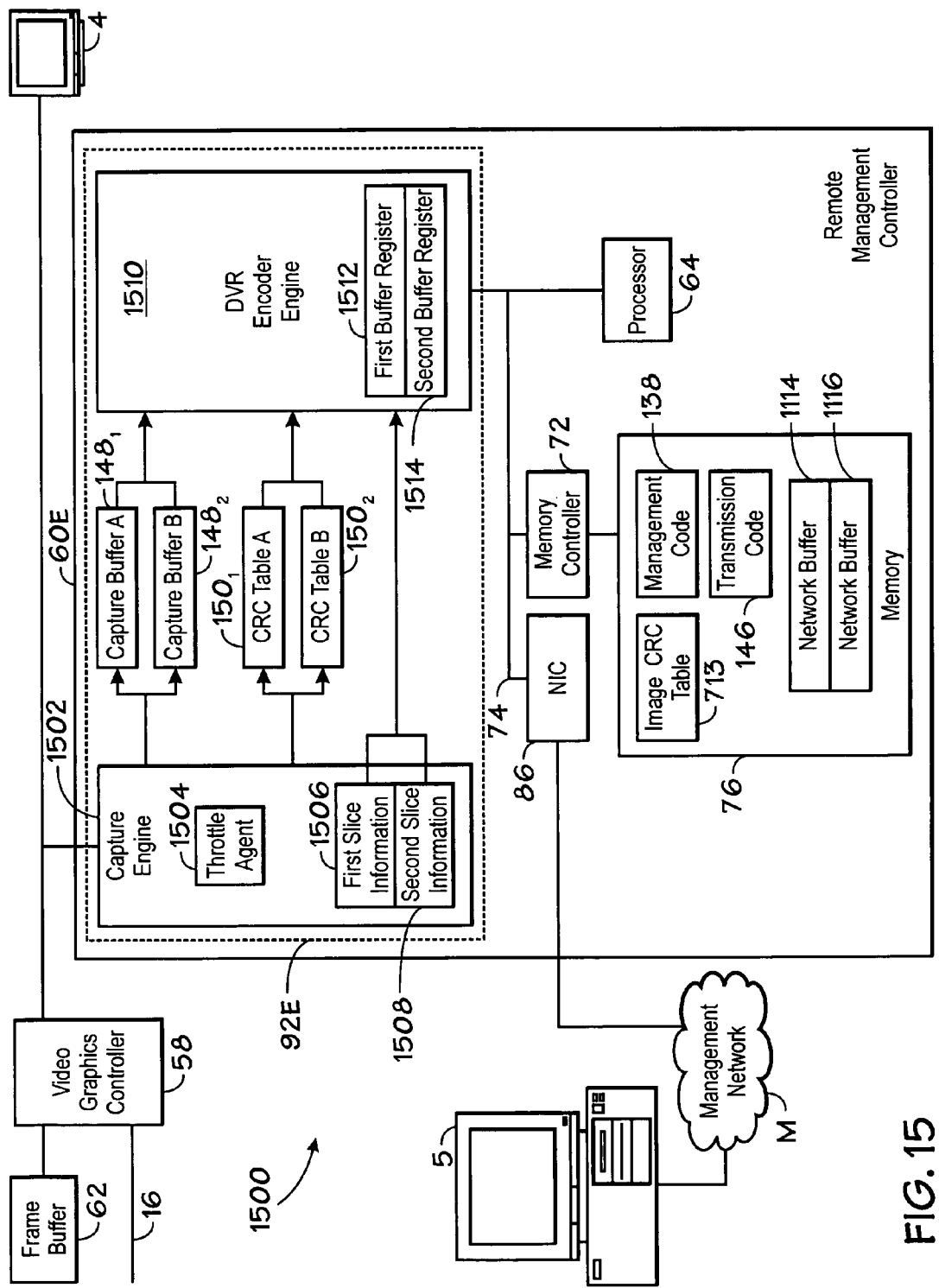

METHOD AND APPARATUS FOR CAPTURING AND TRANSMITTING SCREEN IMAGES

CROSS-REFERENCE TO RELATED APPLICATIONS

This application claims priority to provisional application Ser. No. 60/603,796, filed on Aug. 23, 2004.

This application is further related to the following applications filed, which are filed concurrently with this application and which list the same inventors as this application:

Method and Apparatus for Capturing Video Data to a Virtual Screen Buffer, filed on Aug. 23, 2005, and assigned application Ser. No. 11/209,527;

Method and Apparatus for Capturing Slices of Video Data, filed on Aug. 23, 2005, and assigned application Ser. No. 11/209,943;

Method and Apparatus for Redirection of Video Data, filed on Aug. 23, 2005, and assigned application Ser. No. 11/209,886; and Method and Apparatus for Managing Changes in a Virtual Screen Buffer, filed on Aug. 23, 2005, and assigned application Ser. No. 11/209,897.

BACKGROUND OF THE RELATED ART

This section is intended to introduce the reader to various aspects of art that may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Processor-based devices, such as computer systems, may be linked together via one or more networks, such as Local Area Networks ("LANs") or Wide Area Networks ("WANs"), for example. These networks are generally arranged with a particular topology that characterizes the geometric arrangement of the specific network. For instance, LANs may be arranged in accordance with a bus topology, a ring topology, a star topology, a tree topology, or a combination of such topologies. Further, networks may also be classified by architecture (e.g., peer-to-peer or client/server) and may be characterized by a protocol that defines a common set of rules and signals that are utilized to communicate on the network.

Generally, each network includes one or more servers or processing systems configured to manage and allocate network resources to other systems coupled to the network. File servers, print servers, network servers, and database servers, for example, are different types of processing systems that are generally dedicated to performing pre-defined tasks on the network. Each of these systems may provide services to client systems based upon departmental or logical groupings, which may be distributed across geographic boundaries. As a result, the processing systems may be geographically dispersed to provide services to client systems in different buildings, cities, states, or countries.

Because the systems may be located in different geographic locations, maintenance and management of the systems may be difficult. For instance, a single group or person may provide maintenance and management for the systems, which may be located remotely from some or all of the systems being managed. The time and expense associated with traveling to each of the systems may be prohibitive and may result in unacceptable levels of support for the systems. Thus, it is beneficial to manage the systems remotely without having to travel to the specific location of the systems.

However, the remote management of the systems may provide only limited access to the managed systems. For instance, a managed system may be monitored by a software-based video redirection technology that provides the interaction between the operating system and other components to a remote management system. When the operating system is not performing properly or not loaded, no information is provided to the remote management system monitoring the managed system. That is, the software-based video redirection technology is unable to provide any valuable information to the remote management system because it does not function when the managed system crashes or enters an "OS (operating system) down" state or when the system is powered off. Further, a managed system may include additional hardware, which may only work in a text mode and not provide data when the managed system enters a graphical mode. This additional hardware may duplicate components already available on the managed system, which adds to the total cost of the system. As such, the remote management solutions are inefficient, limited, and expensive.

BRIEF DESCRIPTION OF THE DRAWINGS

Exemplary embodiments of the present invention may be apparent upon reading of the following detailed description with reference to the drawings in which:

FIG. 15 is a functional block diagram illustrating a fourth alternative exemplary remote management controller and video graphics controller of FIG. 2 in accordance with an embodiment of the present invention.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention may provide a methodology for providing data, such as graphical, textual and other data, to a remote management system. A remote management controller may be employed to receive graphical data from a video graphics controller that represents a video image. The video image may be divided into multiple slices with each slice representing graphical data in a portion of the video image. A capture engine within the remote management controller may obtain the graphical data for one of the slices. Then, the remote management controller may analyze the designated slice for changes within the graphical data. The changes in graphical data may be detected by comparing a value for each of the blocks with a previously stored value for the block. Once analyzed, the remote management controller may process the blocks of changed graphical data by compressing the graphical data into compressed data, encoding the compressed data into encoded data, encrypting the encoded data into processed data, and transmitting the processed data. Thus, the present embodiments implement a remote management controller that efficiently provides graphical data to the remote management system.

Figure 1:
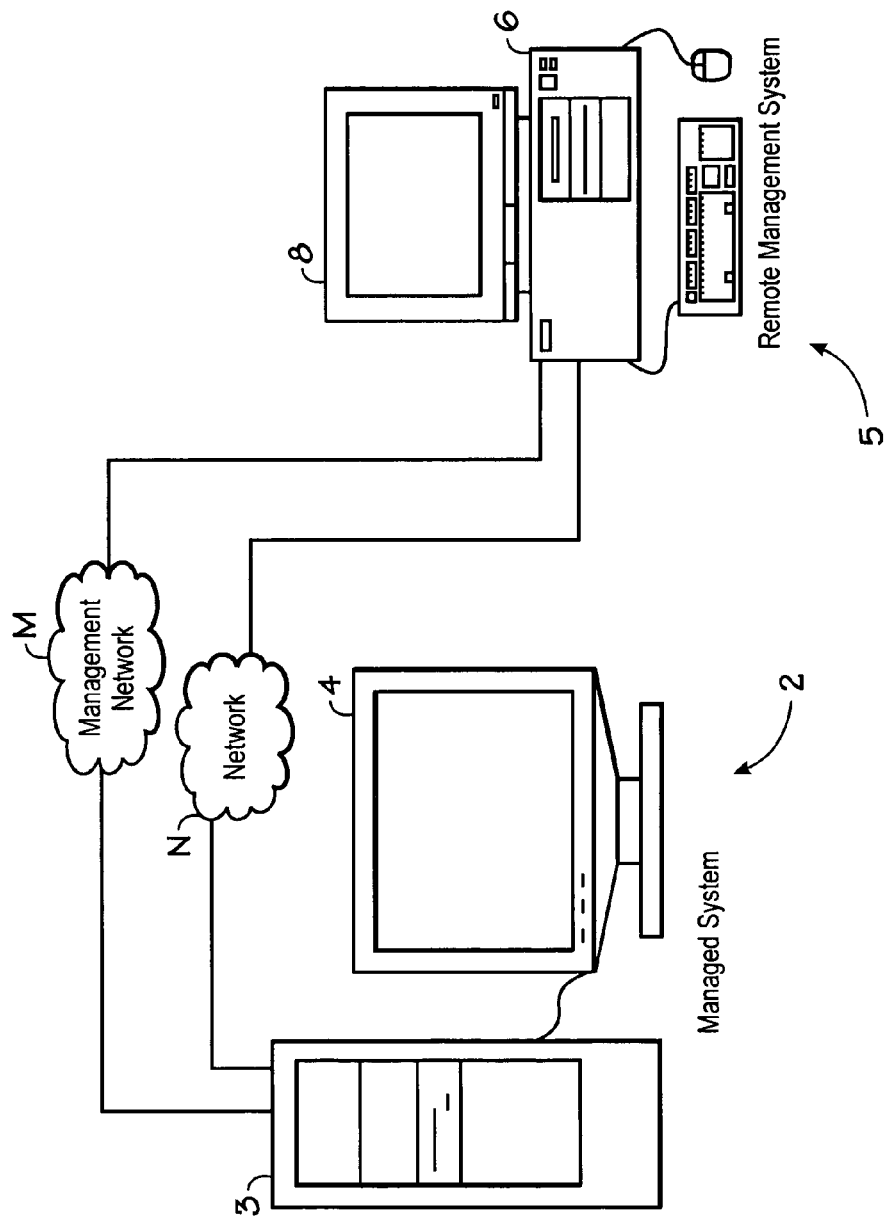
FIG. 1 is a diagram of a managed system and a remote management system in accordance with an exemplary embodiment of the present invention.

Referring now to FIG. 1, a diagram of a managed system and a remote management system in accordance with an exemplary embodiment of the present invention is illustrated. In this diagram, a managed system 2 is connected to a remote management system 5 via a network N and/or a managed network M. The managed system 2 includes a central processing unit ("CPU") 3, which typically includes memory, communications interface, and other circuitry as described more fully below. The CPU 3 may be connected to a monitor 4. The remote management system 5 also may include a CPU 6 and a monitor 8. The managed system 2 includes circuitry and software for capturing, analyzing, compressing and transmitting video images to the remote management system 5 independent of the operating system ("OS") of the managed system 2. Therefore, the present techniques may be useful for accessing, interacting, and/or monitoring the managed system 2 from the remote management system 5 even if the OS of the managed system is malfunctioning or inoperative. More specifically, the video images available for display on the monitor 4 are capable of being viewed on the monitor 8 independent from the operation of the OS in the managed system 2. For example, out of band video traffic that takes place without OS involvement, such as video traffic that occurs during a power on self test, may be displayed on the monitor 8.

The network N and the management network M may be virtually any sort of network capable of transmitting data between two devices. While the networks N and M may include a local area network ("LAN"), a wide area network ("WAN"), a metropolitan area network ("MAN"), a server area network ("SAN"), a hardwired point-to-point connection, or a wireless connection, those skilled in the art will appreciate that the networks N and M may assume other forms or may even provide network connectivity through the Internet. Further, the networks N and M may support communication between the managed system 2 and the remote management system 5, which may be dispersed geographically with respect to each other. It should be understood that the networks N and M may be separate networks, segmented or delineated traffic on the same physical networks (such as VLAN), or a single network (e.g., where regular network traffic and management traffic take place as separate conversations on the same network).

The managed system 2 and the remote management system 5 may be any of a variety of processing devices. For instance, the managed system 2 and the remote management system 5 may be Hewlett-Packard computer systems or servers. However, the principles discussed herein are believed to be applicable to other system platforms or architectures, such as those manufactured by Apple, Sun, and/or International Business Machines ("IBM"). Additionally, the managed system 2 could be one architecture and the remote management system 5 could be another. For example, the managed system 2 may be an x86 architecture computer running Microsoft Windows NT OS, and the remote management system 5 could be a Sun workstation running Solaris OS.

In operation, the graphical data of the video image is captured, analyzed, compressed, and transmitted to the remote management system 5 by circuitry and software in the managed system 2. The remote management system 5 includes software and/or hardware for receiving and interpreting the transmitted graphical data from the managed system 2 to reproduce the video image on the monitor 8. The transmitted graphical data may be encoded to permit the remote management system 5 to interpret the video data stream as further described in FIG. 2 below.

Figure 2:
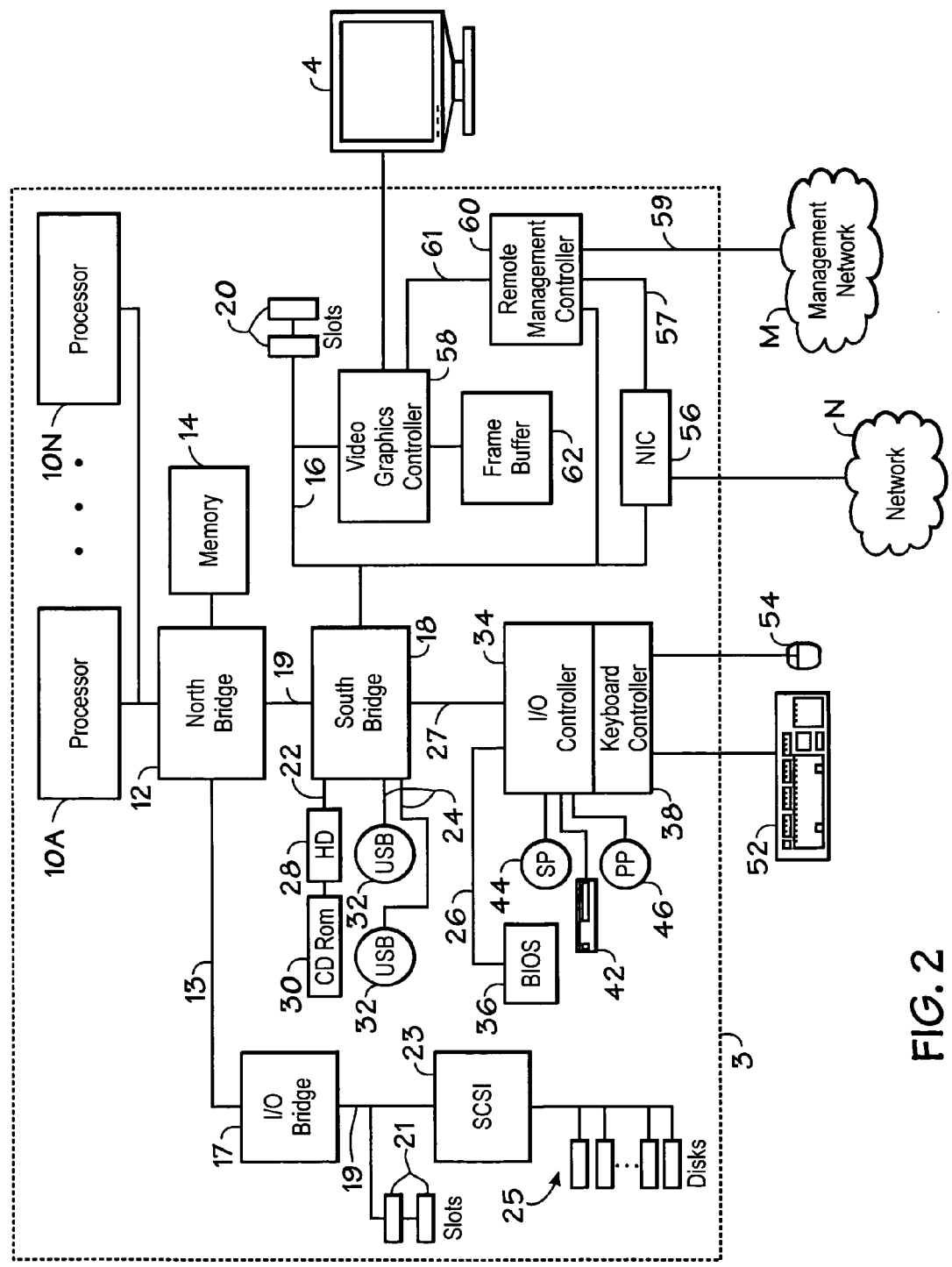
FIG. 2 is a block diagram of the managed system of FIG. 1 in accordance with an exemplary embodiment of the present invention.

In FIG. 2, a block diagram of an exemplary embodiment of the managed system 2 of FIG. 1 in accordance with an exemplary embodiment of the present invention is illustrated. To provide processing power, the managed system 2 includes one or more processors 10A-10N, which are herein referenced as processors 10. For example, the processors 10 may be Pentium processors or other processors manufactured by Intel Corporation. Each of the processors 10 may operate applications and other programs, which may influence the video images presented from the managed system 2.

The processors 10 may be coupled to a north bridge 12. The north bridge 12 may include a memory controller for accessing a main memory 14 (e.g., synchronous dynamic random access memory ("SDRAM"). The north bridge 12 may be coupled to one or more I/O bridges 17 by a bus 13, such as a fast I/O bus. The north bridge 12 also may be coupled via an I/O link 19 to a south bridge 18 which is coupled to a bus 16, such as a PCI or a PCI-X bus. The bus 16 may also be coupled to one or more slots 20 for receiving expansion cards.

The I/O bridge 17 may provide bridging for one or more expansion busses 19, such as additional PCI or PCI-X buses, for example, which may be coupled to various peripheral devices. In this example, the bus 19 is coupled to I/O slots 21 and to a SCSI controller 23, which, in turn, is coupled to a plurality of disk drives 25.

The south bridge 18 may be an integrated multifunctional component, that may include a number of functions, such as, an enhanced direct memory access ("DMA") controller; interrupt controller; timer; integrated drive electronics ("IDE") controller for providing an IDE bus 22; a universal serial bus ("USB") host controller for providing a universal serial bus 24; a system read only memory (ROM) interface 26; a bus controller for providing a low pin count bus ("LPC") 27; and ACPI compliant power management logic. The IDE bus 22 typically supports up to four IDE devices, such as a hard disk drive 28 and a compact disk read only memory ("CD-ROM") 30. The universal serial bus 24 also may be connected to a pair of USB connectors 32 for communicating with USB devices (not shown).

The LPC bus 27 couples the south bridge 18 to a multi-function input/output ("I/O") controller 34, while the system ROM interface 26 couples a basic input/output system ("BIOS") ROM 36 to the multifunction I/O controller 34. The multifunction I/O controller 34, such as a National Semiconductor PC87417, typically includes a number of functions, such as a floppy disk drive controller for connecting to a floppy disk drive 42; a keyboard controller 38 for connecting to a keyboard 52 and a pointing device, such as a mouse 54; a serial communications controller for providing at least one serial port 44; and a parallel port interface for providing at least one parallel port 46. Alternative multifunction input/output ("I/O") controllers are manufactured by Standard Microsystems Corporation and WinBond, for example.

A video graphics controller 58 and one or more communications devices, such as a network interface controller ("NIC") 56, may be coupled to the bus 16. However, it should be noted that the video graphics controller 58 and NIC 56 may be on different bus segments that are coupled to different I/O bridges. The video graphics controller 58 may be an integrated video graphics controller, such as an ATI Radeon 7000, that supports a wide variety of memory configurations, color depths, and resolutions. Connected to the video graphics controller 58 is a frame buffer 62 (e.g. synchronous DRAM) for storing video graphics images written by the processors 10. The video graphics controller 58 may provide the graphical data to the monitor 4 and/or provide the graphical data to another system for systems without monitors. It should be understood that the frame buffer 62 stores a copy of the screen of graphical data that is delivered to the monitor 4 by the video graphics controller 58. The video graphics controller 58 "draws" the entire screen several times a second, e.g., 50-85 times a second, to create a visually persistent image that is visually responsive to the user. That is, when the processors render or otherwise change the contents of the frame buffer 62, the result is communicated to the monitor 4, and thus the user, in a relatively short time period to facilitate full motion video animation on the monitor 4.

A remote management controller 60 may be coupled to the video graphics controller 58, or the video graphics controller 58 may be integrated in the remote management controller 60. The remote management controller 60 receives graphical data that represents a portion of a video image from the video graphics controller 58. For example, the remote management controller 60 may be coupled to an output of the video graphics controller 58, to receive the digital video output ("DVO") or analog outputs signals for instance. The remote management controller 60 analyzes the graphical data for changes, compresses the changed graphical data into compressed data, encodes the compressed data into encoded data, encrypts the encoded data into processed data, and transmits the processed data. The processed data is transmitted by the NIC 56 in the remote management system 5 via the network N and/or a management network M. Although the remote management controller 60 is illustrated as part of the managed system 3, it may be separate from the managed system 3 and the remote management system 6. For example, the remote management controller 60 may be used in a KVM switch.

The remote management controller 60, as described in more detail below, includes circuitry for obtaining graphical data from the video graphics controller 58. The remote management controller 60 may monitor the graphical data from the video graphics controller 58 to analyze the graphical data. For example, the remote management controller 60 may monitor for changes in specific portions of the graphical data. The changes in the graphical data are processed by the remote management controller 60 to compress and encode the changes for transmission to another system, such as the remote management system 5.

In operation, the video graphics controller 58 provides video images in the form of graphical data to the monitor 4, as noted above. This graphical data may be provided in a variety of different resolutions, which may depend upon the settings or configuration parameters within the managed system 2 and remote management system 5. The resolution is based on a combination of the horizontal pixels and vertical pixels utilized to present the video image. This resolution may be defined by a standard, such as Video Graphics Array ("VGA"), super VGA ("SVGA"), and/or extended VGA ("EVGA"), or may be referenced by the number of pixels in each row and column utilized to present the graphical data, such as 1280×1024 or 1600×1200. For example, each pixel in the video image may represent 8 to 10 bits of color information for each CRT gun, which relates to colors, such as red, green, and blue. Accordingly, a resolution of 1600×1200 utilizes about 1.92 million storage elements for the individual pixels of the video image, which may be stored in the frame buffer 62 and transmitted as the graphical data to the monitor 4. Because the graphical data presented to the monitor 4 may be refreshed between 60-85 times per second to maintain the video images on the monitor 4, the graphical data may consume a large amount of storage elements and bandwidth.

Because of the large amounts of graphical data associated with video image, the capture and transmission of real-time graphical data to the remote management system 5 may be problematic. Accordingly, some embodiments of the present technique can throttle the capture of the graphical data to the available network bandwidth. As discussed below, the present embodiments divide the capture of graphical data into a timing dependent process and a non-timing dependent process, which may be mutually exclusive. The timing dependent process captures streaming graphical data in real-time or synchronously and stores it in a capture buffer. Once a slice has been captured, a non-timing dependent or asynchronous process analyzes the captured graphical data. Upon completion of the non-timing dependent process, the timing dependent process resumes and captures the next available slice of streaming graphical data. As a result, the timing dependent process of presenting the graphical data to the monitor 4 is separated from the non-timing dependent analysis of the graphical data to efficiently provide the graphical data to the remote management system 5.

To provide the graphical data to the remote management system 5 in an efficient manner, the graphical data for a video image may be broken into slices, which are discussed below in FIG. 6. These slices provide smaller portions of the graphical data that may be analyzed and processed individually. The slices may be further divided into blocks of graphical data. The changed blocks of graphical data are utilized to maintain the copy of the frame buffer 62, which may be referenced as a virtual screen buffer, as discussed in FIG. 8. To detect the changed blocks, each block is compared with the data previously sent to the remote management system 5. Once a changed block is detected, it is processed by compressing the changed graphical data to form compressed data, encoding the compressed data to form encoded data, encrypting the encoded data to form processed data, and transmitting the processed data.

However, if the graphical data has many different blocks with changes, the processing and transmission of the changed graphical data may not be completed before the next slice is provided from the video graphics controller 58. This time dependency on the analysis of the slice, which is a portion of the video image, may result in the next slice processed and transmitted to remote management system 5 not being the next sequential slice of the video image being presented by the video graphics controller 58. Accordingly, the remote management controller 60 may automatically and dynamically interlace the captured graphical data based upon the amount of time for the analysis of the slice to synchronize the copy of the frame buffer 62. Therefore, the slices may be selected as every other slice or every third slice. Conversely, if no changed blocks are detected or if the captured slice is otherwise processed in time, then each slice of the video image may be captured and analyzed in order. The graphical data is captured proportionally to how it is consumed, allowing the presentation rate to adjust to factors, such as data compressibility, network congestion, quality of service, and/or available network bandwidth. Furthermore, to verify that each slice is processed, the remote management controller 60 tracks the slices that have previously been captured to insure that priority is given to slices that have not recently been captured. This insures that each slice of the video image is eventually captured, analyzed, and synchronized with the frame buffer 62. The tracking of the slices is discussed in greater detail below.

Figure 3:
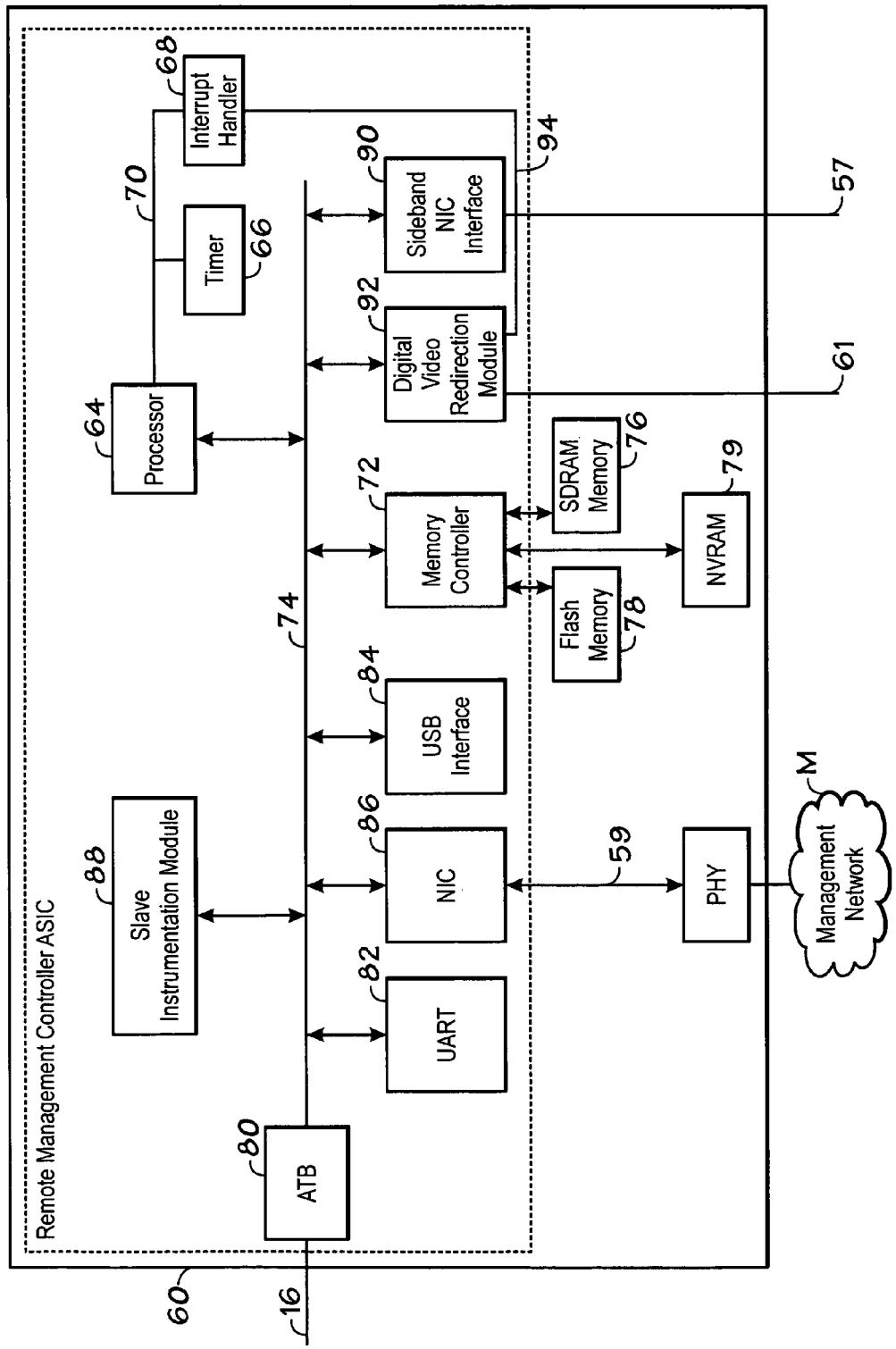
FIG. 3 is a block diagram of the exemplary remote management controller of FIG. 2 in accordance with an embodiment of the present invention.

With the above summary in mind, different embodiments that efficiently provide the remote management system 5 with graphical data from the managed system 2 are described below. As generally illustrated in FIG. 3, the remote management controller 60 is shown with the various components that may be utilized to monitor and interact with the managed system 2. In the first embodiment illustrated in FIG. 4, the remote management controller 60 includes a capture engine, along with the processor 64 for analyzing the graphical data. In the second embodiment illustrated in FIG. 8, the capture engine of the remote management controller 60 detects changes in the blocks of graphical data and includes a DMA engine to move the changed graphical data without the intervention of the processor 64, and a virtual screen buffer maintains a copy of the frame buffer 62 in memory. In the third embodiment illustrated in FIG. 10, the remote management controller 60 includes a change table to accelerate the processing of captured data. The change table identifies areas of the frame buffer 62 that have changed and that, thus, will be updated on the remote management system 5. Additionally, the change table provides a synchronization mechanism for shared resources between the digital video redirection module 92 and the processor 64. In the fourth embodiment illustrated in FIG. 12, the remote management controller 60 includes a digital video redirection ("DVR") encoder engine that identifies and processes areas of the frame buffer 62 that have changed, eliminating the maintenance of any shadow copy of the frame buffer 62 on the remote management controller 60. In the fifth embodiment illustrated in FIG. 15, the remote management controller 60 includes a capture engine and DVR encoder engine that are configured to process multiple slices of graphical data simultaneously.

Turning to FIG. 3, a functional block diagram of an exemplary embodiment of a remote management controller 60 of FIG. 2 is illustrated. All or a portion of the remote management controller 60 may be implemented in a single application specific integrated circuit ("ASIC"). Alternatively, the remote management controller 60 may be implemented in a plurality of integrated circuits or discrete components. Those skilled in the art will appreciate that implementation details, such as deciding which functional aspects of remote management controller 60 are implemented in a single ASIC or different ASICs, are matters of design choice.

For purposes of describing this embodiment clearly, the remainder of this description is written assuming that the remote management controller 60 is implemented using a single ASIC, which may be incorporated into the motherboard of the managed system 2. Additionally, any remote management system 5 that may be connected directly or indirectly to the managed system 2 may establish communication with the remote management controller 60 through its network connection as is more fully described below. Users may further interface with the remote management controller 60 through additional communications interfaces such as a modem.

The remote management controller 60 may be implemented so that it is powered and capable of operation regardless of whether the managed system 2 is powered up or online. Powering the remote management controller 60 regardless of whether the managed system 2 is turned on allows the remote management controller 60 to monitor, analyze and potentially intervene to correct a wide range of system problems that may befall the managed system 2.

The remote management controller 60 may include various logic components to provide interaction with the managed system 2. For instance, an Input/Output processor 64 may provide general control and functions as a management processor for the remote management controller 60. The processor 64 may be implemented as a 32-bit RISC processor, but other processor implementations may be employed as well. The processor 64 is shown in this example as being operatively coupled to a timer module 66 and an interrupt controller 68 via a bus 70.

In this exemplary embodiment, a memory controller 72 is operatively coupled to an internal local bus 74. The memory controller 72 is operatively coupled to dedicated memory, such as SDRAM 76, NVRAM 79, or Flash memory 78. However, other types of memory may also be utilized, which may include ROM, or any other appropriate type of memory. Indeed, in the illustrated embodiment, code executed by the processor 64 is typically stored in the SDRAM 76.

The processor 64 may be operatively coupled to the other functional modules (and possibly many sub-modules) of the remote management controller 60 via the internal local bus 74. Those of ordinary skill in the field will appreciate that the internal local bus 74 exists to allow communication between and among the logical components of the remote management controller 60. For instance, an address translation and bridging ("ATB") unit 80 is operatively coupled to the internal local bus 74 and to a PCI bus 16, which is discussed above. The ATB unit 80 provides access to the PCI bus 16 for the different logic components of the remote management controller 60. Also, a sideband NIC interface 90 may be utilized to communicate with the NIC 56 so that management traffic can flow through the network N.

Further, the remote management controller 60 may include communication interfaces that can be employed to establish out-of-band communication sessions for the remote management controller 60. One such communication interface is a UART interface module 82, which is operatively coupled to the internal local bus 74. The exemplary UART interface module 82 comprises two standard 16550 UARTs, each of which may provide a separate serial communication interface via an RS-232 interface or the Intelligent Chassis Management Bus ("ICMB") interface. Another such communication interface is a USB interface 84, which is operatively coupled to the internal local bus 74. The USB interface 84 may be coupled to a USB host controller (not shown). Further, a Network Interface Controller ("NIC") 86, which is operatively coupled to the internal local bus 74, provides another external communication interface between the remote management controller 60 and remote systems coupled to the Management Network M, which is discussed above. The NIC 86 may include a MAC ("Media Access Controller"), inbound and outbound first-in first-out buffers ("FIFOs"), a DMA engine to transfer packets automatically to and from memory, and an external PHY and typical magnetics and connectors to couple the physical connection ("PHY") to the wire that serves as the transmission media.

To control and monitor functions in the managed system 2, a slave instrumentation module 88 may be utilized. The slave instrumentation module 88 may include an automatic server recovery ("ASR") controller that operates to respond automatically to catastrophic failures of the managed system 2 and a general purpose input/output module ("GPIO") that provides a versatile communication interface. A JTAG master may also be utilized to perform a wide range of control functions on the managed system 2. Further, an I²C master may be utilized to control a plurality of independent I²C serial channels. The slave instrumentation module 88 may also include system support logic to provide a variety of housekeeping and security functions for the managed system 2, such as providing the system identification ("ID"), flash ROM support, error correction code ("ECC") support, hot spare boot support, system post monitor support, floppy write protect, SMI base security measures, open hood detection and the like.

The remote management controller 60 is adapted to receive outputs from the video graphics controller 58. As described in detail below, the digital video redirection module 92 may be configured to receive output signals from the video graphics controller 58, which may be utilized to provide the video images to the remote management system 5. The digital video redirection module 92 may be coupled to one of the outputs, e.g., the DVO 130, of the video graphics controller 58. The components of the digital video redirection module 92 may modify these output signals to provide the processed graphical data to the remote management system 5 via the NIC 86. Also, the digital video redirection module 92 may be coupled to the interrupt handler 68 via a bus 94 to interact with the processor 64 to process the graphical data.

Figure 4:
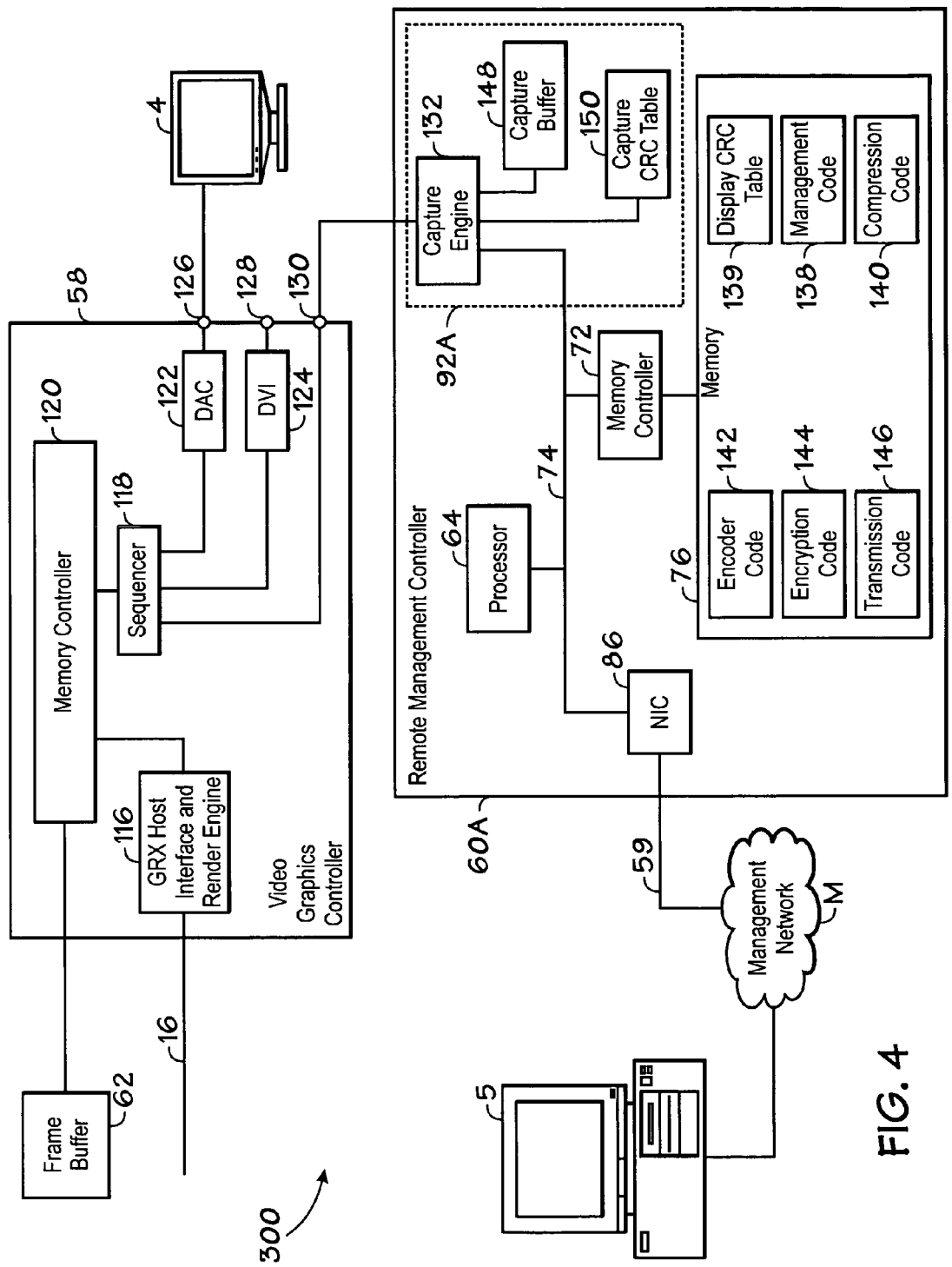
FIG. 4 is a functional block diagram of the exemplary remote management controller and video graphics controller of FIG. 3 in accordance with an embodiment of the present invention.

FIG. 4 illustrates a functional block diagram of an exemplary embodiment of a remote management controller 60A and video graphics controller 58 of FIG. 2 constructed in accordance with the first embodiment of the present invention. The video graphics controller 58 may provide output signals to the monitor 4 and to the remote management controller 60A. The output signals may be analog output signals 126, DVI signals 128, or DVO signals 130 that represent graphical data associated with the video images. For the purposes of the present exemplary embodiments, however, they will be described as utilizing data from the DVO 130 of the video graphics controller 58.

The video graphics controller 58 may provide graphical data, which is stored in the frame buffer 62, to the monitor 4 and to the remote management controller 60A. The video graphics controller 58 may include a GRX Host Interface and render engine 116 that couples the video graphics controller 58 to a system bus, such as a PCI-type bus 16. It also may include a 2-D and/or 3-D rendering engine. The memory controller 120 receives data from the GRX Host Interface and rendering engine 116 and stores such data in the frame buffer 62. The display engine or sequencer 118 is the portion of the video graphics controller 58 that takes graphical data from the frame buffer 62, converts the data into a displayable RGB value, and delivers such converted data to one or more of the output interfaces of the video graphics controller 58. The data stored in the frame buffer 62 may include color index entries, RGB entries, or other color space entries, such as YUV, depending on the selected video mode. Control registers in the GRX Host Interface and render engine 116 provide the sequencer 118 with information so that it may interpret such data, including formatting and resolution of the data.

To provide the graphical data to the monitor 4 and/or the remote management controller 60A, the video graphics controller 58 may utilize different nodes 126, 128 and 130 to provide different types of output signals. In this embodiment, the remote management controller 60A is coupled to the DVO node 130, although it may be coupled to other nodes as described below. The memory controller 120 provides digital output signals to the sequencer 118, which is coupled to other components to convert the digital output signals into different types of output signals that are provided on the nodes 126, 128 and 130. For instance, the digital-to-analog converter ("DAC") 122, which converts the digital output signals into analog output signals, may provide analog output signals via the node 126. For the remote management controller 60A to receive these signals from node 126, an analog to digital converter (not shown) may be utilized to convert the analog output signals into digital output signals suitable for processing by the remote management controller 60A. Similarly, the DVI component 124 may provide DVI output signals, which are serial digital output signals, via the node 128. For the remote management controller 60A to receive these serial digital output signals from node 128, a DVI receiver (not shown) may be utilized to convert the serial digital output signals into parallel digital signals suitable for processing by the remote management controller 60A. Further, direct digital video output signals ("DVO"), which are parallel digital output signals, may be provided directly from the memory controller 120 via the node 130, and the remote management controller 60A may receive these signals directly from the node 130.

Regardless of how the graphical data is transmitted, the remote management controller 60A may include various components that process the graphical data provided in the output signals from the video graphics controller 58. For instance, the remote management controller 60A may include a digital video redirection module 92A, a processor 64, memory controller 72, memory 76, and NIC 86. The digital video redirection module 92A may include a capture engine 132, a capture buffer 148, and a cyclical redundancy check ("CRC") table 150 that may be utilized to capture the output signals from the video graphics controller 58. In the timing dependent process, the capture engine 132 monitors and captures a portion, or "slice," (e.g., several blocks) of the video stream of graphical data from the video graphics controller 58. Then, in the non-timing dependent process, the processor 64 may analyze and process the graphical data. Thus, the timing dependent process of capturing the graphical data is separated from the analysis of the graphical data to efficiently provide the graphical data to the remote management system 5.

To capture the real-time video stream, the capture engine 132 is connected to the video graphics controller 58. The capture engine 132, which is discussed further in FIG. 7, obtains specific slices of graphical data from the video graphics controller 58 and interfaces with the capture buffer 148 and the capture cyclic redundancy check ("CRC") table 150. The slices of graphical data may include one or more scanlines, which are rows of horizontal pixels grouped together to form a slice of the video image, as discussed further below in regard to FIG. 6. The capture engine 132 may monitor the video stream from the video graphics controller 58. For example, the capture engine 132, when enabled, may continuously monitor the video output signals. When the capture engine 132 is instructed to capture the next slice or another designated slice, it uses its monitored position to determine the approximate slice boundary to begin capturing data. Because the graphical data is continuously being updated by the video graphics controller 58, the capture engine can capture the designated slice during a future refresh operation, should the monitored position be beyond the starting point of the designated slice. The video stream from the video graphics controller 58 includes output signals that indicate the horizontal and vertical position of graphical data within the frame buffer 62. Specifically, the horizontal synchronization signal HSYNC and vertical synchronization signal VSYNC, along with a pixel clock signal PixelClk may be provided from the video graphics controller 58, as discussed in FIG. 7. Additionally, a display enable signal DISP_EN may be provided to delineate actual pixel data from border, overscan, and retrace areas of the image displayed by the video graphics controller 58. By examining these signals, the capture engine 132 determines the slice or actual location in the frame buffer 62 being provided from the video graphics controller 58. Further, the capture engine 132 may sample the RGB value of the pixel and perform a bit-reduction on this graphical data. The bit reduction may include stripping the least significant bits of each color gun from the pixel color value. As such, the capture engine 132 may obtain specific slices of the video stream from the video graphics controller 58 and store the graphical data in the capture buffer 148 through the use of a write operation.

Then, the capture engine 132 analyzes the individual pixels or groups of pixels within the captured slice, which may be referred to as blocks. The analysis may include determining whether the blocks have changed by calculating a value for each block, so that the processor 64 can compare the calculated values with previously stored values to detect any changes in the blocks. The values may be digital signatures generated for each block of the designated slice for purposes of detecting changes to that region. The digital signatures may be calculated simultaneously with the receipt of the graphical data or after the graphical data is stored within capture buffer 148. The capture buffer 148 may be a memory that is dedicated to the capture engine 132 or may be a portion of the memory 76. A capture CRC table 150 may be utilized to store calculated CRC values that correspond to digital signatures of the respective graphical data that represents a pixel or block of pixels. The data in the CRC table 150 represents the individual blocks in the capture buffer 148. The size of the CRC table 150 may be "n" blocks by the error correction code word length, which may be represented by 128×32 bits or 4096 bits of data for example. The use of the CRC values, or other similar digital signature values, reduces the memory utilized to store the previous contents of the blocks of the video frame buffer 62. For example, the processor 64 may maintain a complete display CRC table 139 in the memory 76 corresponding to all blocks of the frame buffer 62. The processor 64 may compare values from the capture CRC table 150 against previously recorded values stored within the memory 76 to identify blocks in the capture buffer 148 that have been modified since the last time the slice was captured. The capture CRC table 150 may be stored in random access memory, such as static random access memory ("SRAM"), dynamic random access memory ("DRAM"), or other suitable memories.

The processor 64 may be a microprocessor that is utilized by the remote management controller 60A to manage the processing of graphical data that is transmitted to a remote management system 5. The processor 64 utilizes the memory controller 72 to access the code and data within the memory 76. The memory 76 may include code, such as management code 138, that is executed by the processor 64 to track the slices captured by the capture engine 132. The management code 138 may notify the capture engine 132 regarding the designated slice of the graphical data that has not been analyzed or when the previous slice has been processed. The management code 138 may track slices that have previously been captured to insure that priority is given to slices that have not recently been captured. This insures that each of the slices of the frame buffer 62 are eventually captured, analyzed, and synchronized with respect to the shadow copy or duplicate copy of the frame buffer 62. Once a previous slice has been processed, the capture engine 132 may access another designated slice. The next designated slice may be the next slice boundary to be clocked out of the video graphics controller 58 or a specific slice that has not been recently captured. As such, the capture engine 132 may bypass other slices to access the designated slice.

The memory 76 may also include other code, such as compression code 140, encoder code 142, and/or encryption code 144, that is executed by the processor 64 to process the slice or blocks of graphical data before transmission to the remote management system 5. For instance, the compression code 140 may utilize the capture CRC table 150 along with any suitable algorithms or techniques to compress specific portions of graphical data, such as blocks or individual pixels, to form compressed data. For example, the compressed data may be formed using techniques described in U.S. Pat. No. 6,774,904. The compression code 140 may also utilize Joint Photographic Experts Group ("JPEG"), Motion Picture Experts Group ("MPEG"), or any other suitable compression technique. Similarly, the encoder code 142 may format the compressed data according to a standard format to form encoded data. The encryption code 144 may encrypt the encoded data using various encryption techniques to form processed data. For instance, the encryption code 144 may utilize public and private key pairs, a cryptographic hash, symmetric encryption, and asymmetric encryption techniques. It should be noted that if these steps are performed, they may be performed sequentially or in parallel.

Once the code 140, 142 and/or 144 has been utilized to process the graphical data, the transmission code 146 is utilized by the processor 64 to transmit the processed data to the remote management system 5. The transmission code 146 may prepare the processed data for transmission to another system over different communication media. For instance, the transmission code 146 may interact with the NIC 86 to manage the transmission of the rocessed data or may utilize a connection 57 with the NIC 56 as shown in FIG. 2, for example. Regardless, the processor 64 utilizes the codes 138, 140, 142, 144 and 146 to provide the specific portions of the designated slice to other systems, such as the remote management system 5.

Beneficially, the first embodiment enables video data to be efficiently and inexpensively captured. Since the capture buffer 148 only holds a portion of the visible display, it can be advantageously smaller. For example, if the capture buffer is constructed to hold 16 scan lines, it will only contain 20 k pixels instead of 1.3M pixels for an example resolution of 1280×1024. Those skilled in the art will appreciate that this technique facilitates the capture buffer 148 to be constructed inexpensively with extremely fast memory, such as SRAM. This allows the capture process to proceed at the full video presentation rate. By decoupling the capture and data processing steps, graphical data can be processed and transmitted at a different rate than it is captured. Thus, the redirection process may dynamically adjust to factors such as available network bandwidth and processing speed. The efficiency of these factors may determine the frequency at which additional slices may be captured and consequently the frequency of complete synchronized image frames available at the remote management system 5.

In addition, the use of the remote management controller 60A enhances the system's scalability. For instance, the remote management controller 60A may receive graphical data from any of the output ports 126, 128 and 130 of the video graphics controller 58 and is not dependent on specific video controllers and their operation through their system interconnect of buses. Thus, the video data may be captured in an industry standard and industry consistent fashion by utilizing timing waveforms established in video monitor technologies. In other words, because the remote management controller 60A is not coupled to the system bus, e.g., the PCI-type bus, at the input of the video graphics controller 58, the remote management controller 60A is not dependent upon certain system specific constraints. These constraints may include available system bus bandwidth, system bus lockup conditions, bus reset issues, and the like.

Figure 5:
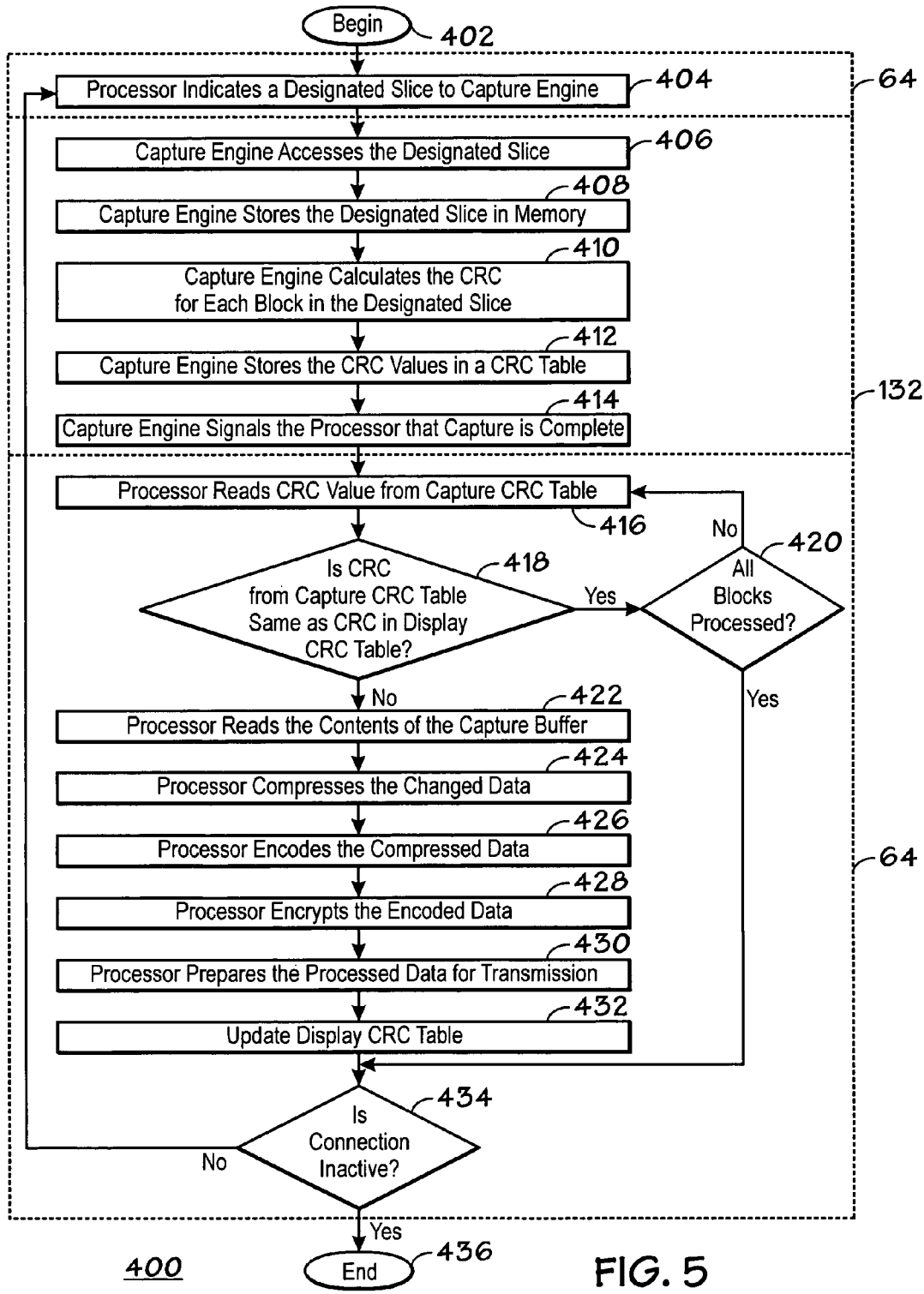
FIG. 5 is a process flow diagram illustrating the use of the remote management controller of FIG. 4 in accordance with an exemplary embodiment of the present invention.

FIG. 5 is a process flow diagram illustrating the exemplary use of the remote management controller 60A of FIG. 4 in accordance with the first embodiment of the present invention. The process flow diagram is generally referred to by reference numeral 400. As shown in FIG. 5, the remote management controller 60A may utilize the capture engine 132, processor 64, memory controller 72, memory 76, and NIC 86 to analyze designated slices of graphical data provided from the video graphics controller 58.

The process begins at block 402. At block 404, management code 138 may indicate to the capture engine 132 that a designated slice of the frame buffer may be captured. The indication may be a signal that notifies the capture engine 132 to analyze a specific slice or the next available slice of the frame buffer 62. For example, the capture engine 132 may utilize the horizontal synchronization signal (HSYNC), vertical synchronization signal (VSYNC), and pixel clock signal (PixelClk) from the video graphics controller 58 to determine the starting location for the next slice to be scanned. At block 406, the capture engine 132 may access the designated slice. Once the capture engine 132 has located the designated slice, the capture engine 132 may store the designated slice in the capture buffer 148, as shown in block 408. Then, the capture engine 132 calculates the CRC values for each block in the designated slice, as shown in block 410. The CRC values may be calculated using various mathematical techniques used to generate a digital signature, check for changes, or other suitable method. These CRC values may be stored in the capture CRC table 150, as shown in block 412. Once the CRCs values are stored for each of the blocks in the designated slice, the capture engine 132 may notify the processor 64 that the capture engine 132 has completed its capture and analysis of the designated slice, as shown in block 414.

Once the capture engine 132 has completed its capture and analysis of the designated slice, the processor 64 may process the captured graphical data for possible transmission to the remote management system 5, as shown in blocks 416-436. It should be understood that the processor 64 does not process unmodified blocks. At blocks 416 and 418, the processor 64 reads the CRC values stored in the capture CRC table 150 and compares the calculated CRC values with previously calculated values stored in a complete display CRC table 139 in the memory 76. If the CRC values match, the block has not changed, so the processor 64 repeats the process for the remaining blocks in the slice, as illustrated in blocks 416-420. However, if the CRC comparison indicates a change, the processor 64 reads the modified graphical data of the capture buffer 148 to prepare it to be transferred to the remote management system 5, as set forth in block 422. The processor 64 may process the block in various ways to prepare it for transmission. For example, the processor 64 may compress the blocks of the designated slice using the compression code 140, as shown in block 424. At block 426, the processor 64 may encode the compressed data using the encoder code 142. It should be noted that the encoding routine may place the graphical data into a predetermined format that include constructs for compression. As a result, the compression and encoding may be performed by the same code. At block 428, the processor 64 may encrypt the encoded data via the encryption code 144 to form the processed data. The processed data, whether encrypted or not, may be prepared for transmission using the transmission code 146, as shown in block 430 and the display CRC table 139 may be updated as shown in block 432. With the graphical data modified into processed data, the management code 138 may determine if the connection to the remote management system 5 is inactive, as shown in block 434. If the connection is active, the management code 138 may indicate another slice to be accessed by the capture engine 132, as shown in block 404. However, if the connection is inactive, the process may end at block 436.

Prior to continuing this discussion, it has been mentioned above that the graphical data that represents the video image may be divided into various slices. FIG. 6 is an exemplary embodiment of the video image that may be divided into slices and blocks in accordance with embodiments of the present invention. In this diagram, a video image 500, such as the one created from the contents of the frame buffer 62 for presentation to the monitor 4, may be divided into different areas, such as viewable areas and non-viewable areas. The viewable areas and non-viewable areas may be utilized in analyzing the video image 500.

The viewable areas and non-viewable areas may be defined based upon the overlap between the different sections of the output from the video graphics controller 58. For instance, with regard to the vertical side, the video image 500 may include a first vertical unviewable section 506, a vertical viewable section 508, and a second vertical unviewable section 510. Similarly, with regard to the horizontal side, the video image 500 may include a first horizontal unviewable section 512, a horizontal viewable section 514, and a second horizontal unviewable section 516. The viewable sections 508 and 514 overlap to define a viewable area 518 of the video image 500. The viewable area 518 is utilized to present the graphical data from the applications, processors, or other sources, through the use of the color bits that are associated with each of the respective pixels in the viewable area 518. The unviewable sections 506, 510, 512 and 516 overlap to define an unviewable area 520 of the video image 500, which forms a border around the viewable area 518. The unviewable area 520 may include darkened portions of the video image 500 that are not presented to a user.

Within the viewable area 518 of the video image 500, the pixels may be divided into slices $502_0$-$502_N$ and blocks $504_{00}$-$504_{NM}$ to provide definable areas in the video image 500. For example, the horizontal rows of pixels, which may be referenced as scanlines, are grouped together into slices $502_0$-$502_N$. The value of N is determined by dividing the number of horizontal rows of pixels by the number of scanlines defined in each slice $502_0$-$502_N$. Further, each of the slices $502_0$-$502_N$ may be divided into groups of pixels that are references as blocks $504_{00}$-$504_{NM}$. The blocks $504_{00}$-$504_{NM}$ may be grouped based upon a specific pixel, a specific pixel along with one or more adjacent pixels, or a specific group of pixels. This division of the pixels into blocks $504_{00}$-$504_{NM}$ and slices $502_0$-$502_N$ provides definable portions of the video image 500 that may be analyzed for features, such as changes or other characteristics.

For instance, if the viewable area 518 of video image 500 is to be displayed at a resolution of 1600×1200, then the vertical viewable section 508 is equal to 1200 rows of pixels and the horizontal viewable section 514 is equal to 1600 columns of pixels, which provides a viewable area 518 of 1600 pixels by 1200 pixels. To divide the image into manageable portions, the slices $502_0$-$502_N$ may include 16 horizontal rows of pixels, while each of the blocks $504_{00}$-$504_{NM}$ may include 16 vertical rows and 16 horizontal rows of pixels. Accordingly, 75 slices $502_0$-$502_N$ may be formed for the viewable area 518 and 100 blocks $504_{00}$-$504_{NM}$ may be formed in each of the designated slices $502_0$-$502_N$. Alternatively, for a viewable area 518 of 1280 pixels by 1024 pixels, the slices $502_0$-$502_N$ may include 16 vertical rows of pixels, while the blocks $504_{00}$-$504_{NM}$ may be 16 vertical rows by 16 horizontal rows of pixels. In this configuration, 64 slices $502_0$-$502_N$ may be formed in the viewable area 518 and 80 blocks $504_{00}$-$504_{NM}$ may be formed in each of the designated slices $502_0$-$502_N$. Accordingly, it should be noted that the size of the slices $502_0$-$502_N$ and blocks $504_{00}$-$504_{NM}$ along with the resolution may be adjusted or modified as a matter of design choice.

Beneficially, the segmentation of the viewable area 518 of the video image 500 into slices $502_0$-$502_N$ and blocks $504_{00}$-$504_{NM}$ divides the viewable area 518 into smaller portions that may be efficiently analyzed for changes. That is, the changes in the graphical data associated with each of the blocks $504_{00}$-$504_{NM}$ may be analyzed to detect changes in the video image 500. The size of the blocks $504_{00}$-$504_{NM}$ may be adjusted to depend on the processing power of the capture engine 132, the number of capture engines 132 utilized within the remote management controller 60A, and/or the amount of capture buffer available.

Figure 7:
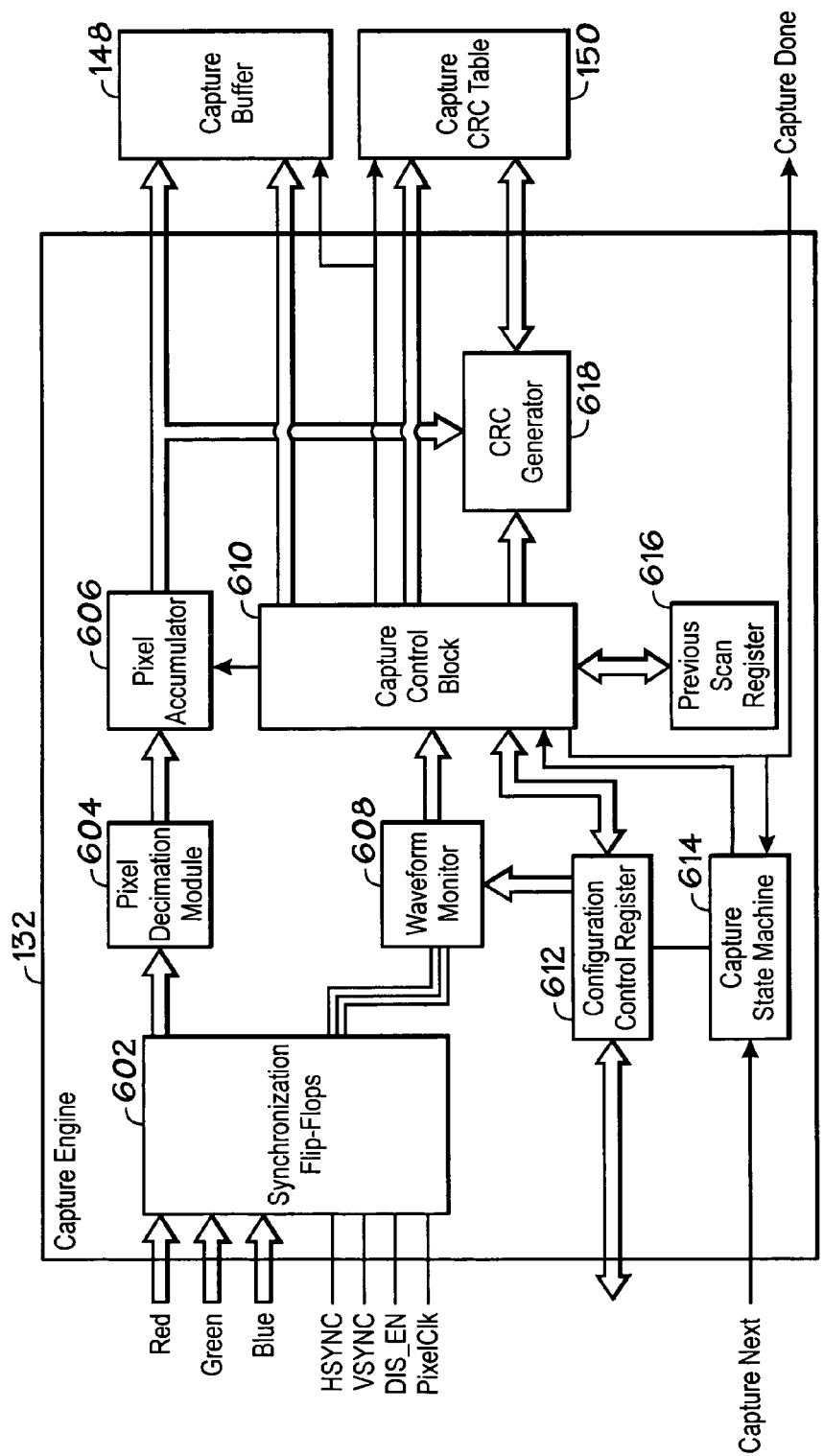
FIG. 7 is a functional block diagram of an exemplary embodiment of the capture engine of FIG. 4 in accordance with an exemplary embodiment of the present invention.

FIG. 7 illustrates a functional block diagram of an exemplary embodiment of a capture engine 132 of FIG. 4 constructed in accordance with an embodiment of the present invention. In this embodiment of the capture engine 132, the capture control block 610 manages the incoming signals, control signals, capturing of graphical data, and clocking for the capture engine 132. In particular, the capture control block 610 may continuously monitor the output signals from the video graphics controller 58 based on various control signals. Also, the capture control block 610 generates the address/control signals and the clock signals to the capture buffer 148 and the CRC table 150. In addition, the capture control block 610 manages the communication of the capture done signal CaptureDone to indicate that the capture engine 132 has completed analysis of the graphical data. The capture state machine 614 receives the capture next slice signal CaptureNext to indicate that the capture engine 132 is to process the next slice of graphical data.

The output signals from the video graphics controller 58 may be received by the synchronization flip-flops 602. The synchronization flip-flops 602 are used to sample the incoming signals to manage the timing of the signals for the internal logic of the capture engine 132. These signals may include red color signals RED, blue color signals BLUE, green color signals GREEN, a horizontal synchronization signal HSYNC, a vertical synchronization signal VSYNC, pixel clock signal PixelClk, and display enable signal DISP_EN. The red color signals RED, blue color signals BLUE and green color signals GREEN may be 8 bits of color data that are associated with each of the respective colors. Further, the horizontal synchronization signal HSYNC may be associated with the horizontal aspects of the graphical data, while the vertical synchronization signal VSYNC may be associated with the vertical aspects of the graphical data. The pixel clock signal PixelClk may provide a clock signal to the synchronization flip-flops 602, while the display enable signal DISP_EN may indicate if the remote management system is being provided signals in the display area 518.

From the synchronization flip-flops 602, the color signals, which include the red color signals RED, blue color signals BLUE and green color signals GREEN, are provided to the pixel decimation module 604. The pixel decimation module 604 may keep the upper 4 bits of each of the color signals for further processing within the capture engine 132. However, the lower 4 bits may be truncated, rounded, or dropped to reduce the amount of graphical data that is processed and transmitted. It should be noted that these lower bits may be utilized if more color accuracy is desired. Then, the truncated signals are combined together and provided to a pixel accumulator 606.

The pixel accumulator 606 groups the pixels and provides the truncated color signals to the capture buffer 148 and the CRC generator 618. For instance, the pixel accumulator 606 may combine the even and odd pixels to double the data width of the accumulated pixel data. The pixel accumulator 606, which may be a set of flip-flops that alternately capture the incoming truncated color signals into an "even" and "odd" set of flip-flops. As a result, the output data of the pixel accumulator 606, which is accumulated signals, is twice the bus width of the incoming data set and may be sent to capture buffer 148 and CRC generator 616 at half of the speed of the pixel clock signal PixelClk. The CRC generator 618 performs a 32-bit CRC of the accumulated signals. To calculate the CRC of a block, the CRC generator 618 saves and restores intermediate data represented by the accumulated signals to the CRC table 150 as each block is addressed. When the entire slice has been scanned, the capture CRC table 150 contains a complete CRC for each block within the slice. The coordination of the data being stored in the capture CRC table 150 and the capture buffer 148 is further explained below.

The control signals from the synchronization flip-flops 602 are provided to the waveform monitor 608. The waveform monitor 608 analyzes the incoming signals, such as the horizontal synchronization signal HSYNC, vertical synchronization signal VSYNC, and DISP_EN signals, to determine the total horizontal width, total vertical width, current horizontal position, current vertical position, etc. The waveform monitor 608 passes this information to the capture control block 610 for use in generating the memory clock signal RAMClk and determining when to start a capture of the output signals from the video graphics controller. Specifically, the horizontal synchronization signal HSYNC and vertical synchronization signal VSYNC enable the capture control block 610 to monitor the current horizontal position and current vertical position to start and stop the capture of the incoming signals.

As another source of control signals, the capture control block 610 is coupled to the configuration control registers 612 and capture state machine 614. Accordingly, the configuration control register 612, which is coupled to a register read/write interface, provides control information, such as horizontal synchronization signal HSYNC polarity and vertical synchronization signal VSYNC polarity, to the capture control block 610. From the capture state machine 614, the capture control block 610 may receive an arming signal, such as a capture next slice signal CaptureNext. The arming signal is provided to the capture state machine 614 once an indication is received from the processor to capture the next slice. The capture next slice signal CaptureNext may indicate that the encoder has completed processing the previously captured slice and the capture engine 132 should begin capturing the next available slice. As such, the configuration control registers 612 and capture state machine 614 may provide additional control information that is utilized by the capture control block 610 to process the graphical data.

To determine the previously captured slices, the capture control block 610 may access the previous scan register 616. The previous scan register 616 may maintain a list of previously captured slices that is utilized to insure that each of the slices for an image is captured before other slices are scanned again. For instance, the previous scan register 616 may be initially filled with "0" to indicate that none of the slices have been captured. As slices are scanned, the corresponding bit position is set with a "1" in the previous scan register 616. When the arming signal, such as the capture next slice signal CaptureNext, is received by the capture control block 610, the capture control block 610 may examine the registers of the previous scan register 616 to determine which slices have not been scanned. Then, once each of the slices has been scanned, the previous scan register 616 may again be filled with "0's."

The capture control block 610 may coordinate data being stored and provide a clock signal to the capture CRC table 150 and the capture buffer 148. For instance, the capture control block 610 may coordinate the data being stored in the capture CRC table 150 and the capture buffer 148 by providing address/control signals that are based on the control signals received from the waveform monitor 608, configuration control register 612, and capture state machine 614. Further, the capture control block 610 may provide the memory clock signal RAMClk based on this same information. The capture control block 610 may provide a clock signal that is 1/n, where n=1, 2, or 4, for example, of the speed of the pixel clock signal PixelClk to match the data being provided from the pixel accumulator 606. The capture control block 610 divides the incoming pixel clock signal PixelClk by n and phase aligns the output of the memory clock signal RAMClk to match the assertion of display enable signal DISP_EN. If n=2, this insures that the first pixel in every horizontal row is an "odd" pixel.

Figure 8:
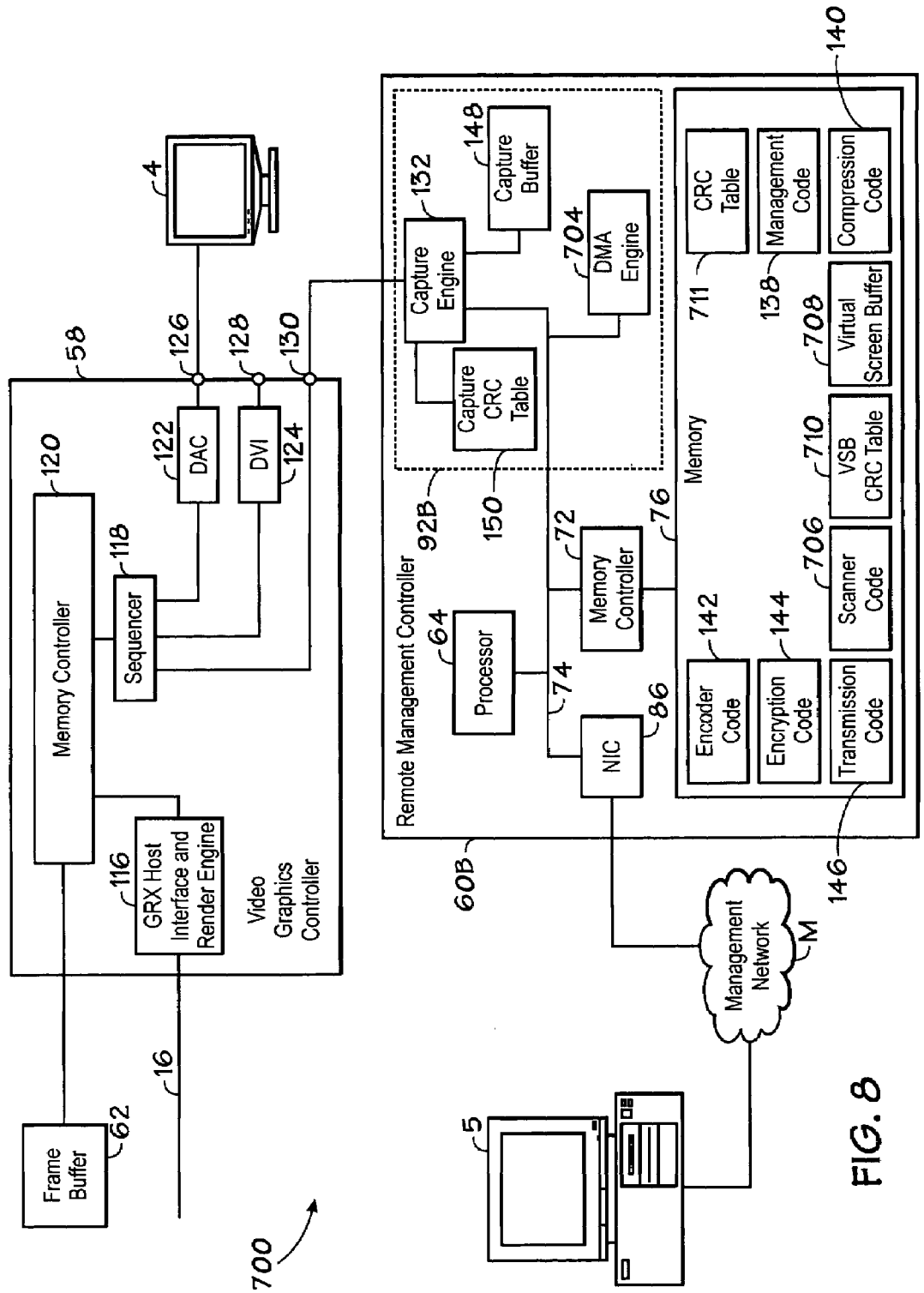
FIG. 8 is a functional block diagram of a first alternative exemplary remote management controller and video graphics controller of FIG. 2 in accordance with an embodiment of the present invention.

FIG. 8 illustrates a functional block diagram of a first alternative exemplary embodiment of a remote management controller 60B and video graphics controller 58 of FIG. 2. In the diagram 700, the remote management controller 60B may include additional components to handle changes in the graphical data being provided from the video graphics controller 58. For example, the digital video redirection module 92B may include a capture engine 132, a capture buffer 148, a capture CRC table 150, and a DMA engine 704. The DMA engine 704 may be utilized to move the changed graphical data to a virtual screen buffer ("VSB") 708. By utilizing the DMA engine 704 and the VSB 708, the remote management controller 60B may further reduce the interaction with the processor 64 to move graphical data.

Accordingly, various code and components of the present embodiment may operate in a similar manner to those discussed above in FIG. 4. For instance, the video graphics controller 58 may include various components 116, 118, 120, 122 and 124, and nodes 126, 128 and 130, which may operate, as discussed above with regard to FIG. 4. Also, the remote management controller 60B may include the capture engine 132, memory controller 72, various code 138, 140, 142, 144, and 146 in the memory 76, the processor 64, and the capture buffer 148 and capture CRC table 150, which may operate as discussed above with regard to FIG. 4.

Figure 6:
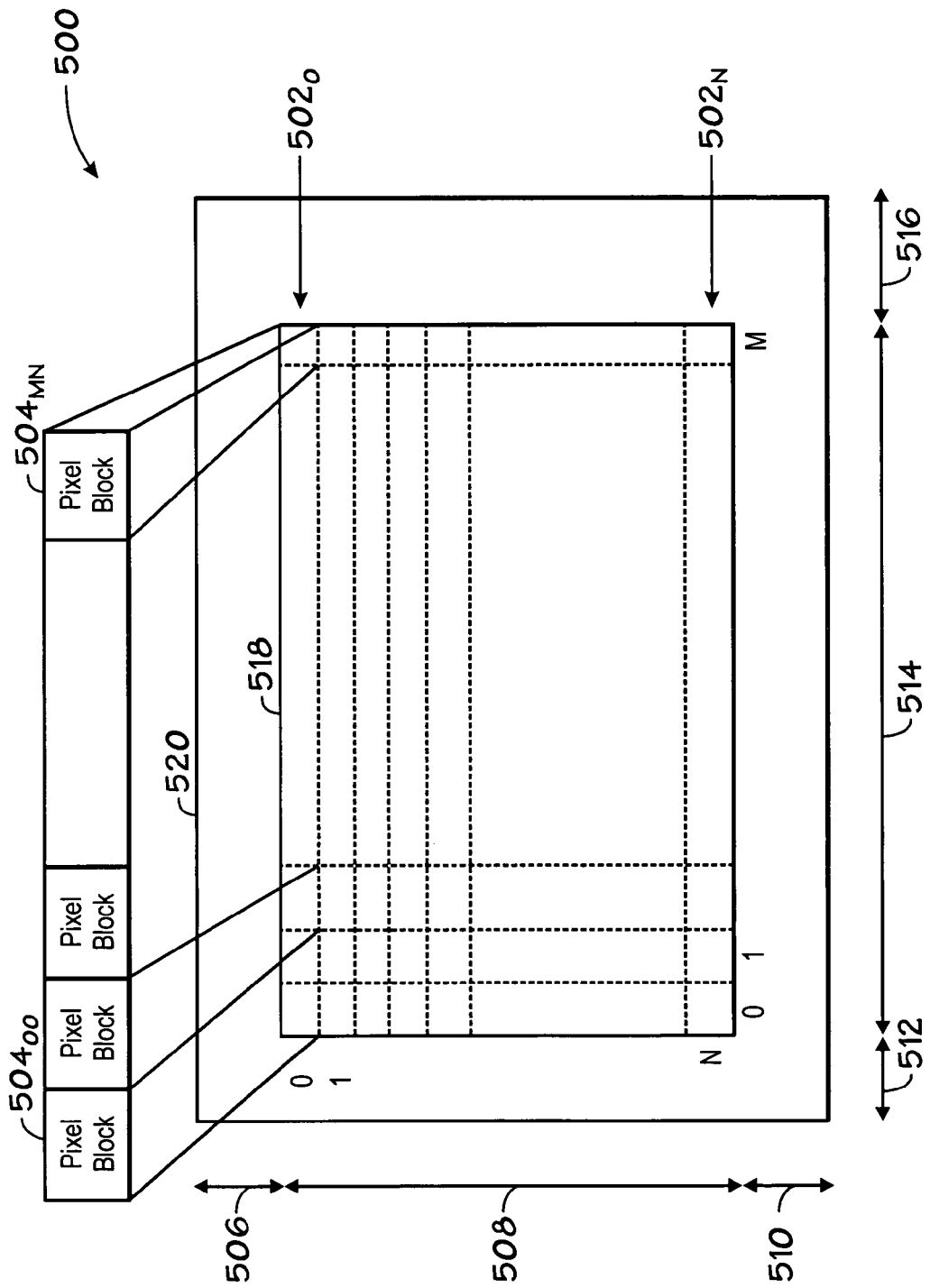
FIG. 6 is an exemplary embodiment of the video image that may be divided into slices and blocks in accordance with an embodiment of the present invention.

In this embodiment, the capture engine 132 may access a designated slice, which may be one of the slices $502_0$-$502_N$ of FIG. 6, to analyze the blocks, which may be one of the blocks $504_{00}$-$504_{NM}$ of FIG. 6, within the designated slice for changes in the graphical data. These changes may be stored in the virtual screen buffer 708. Then, the scanner code 706 may detect changes in the virtual screen buffer 708 to determine the change in the graphical data that is to be transmitted to the remote management system 5.

In the remote management controller 60B, the capture engine 132 may analyze the designated slice for changes in the different blocks within the designated slice. The capture engine 132 may analyze the designated slice by comparing the CRC values for the designated slice in the capture buffer 148 against the previously stored CRC values in the VSB CRC table 710. If the block within the capture buffer 148 has changed, the capture engine 132 may notify the DMA engine 704 which block has changed. The notification may include passing a block pointer to the DMA engine that is associated with the block that has changed. The DMA engine 704 may transfer graphical data from the capture buffer 148 to the virtual screen buffer 708 without the processor 64 or other program intervention. The virtual screen buffer 708, which is a copy of the video image stored in the frame buffer 62, may correspond to a 1280 pixel by 1024 pixel viewable area with 12 bits representing the color each pixel, or a 1600 pixels by 1200 pixel viewable area with 8-15 bits representing the color for each pixel, for example.

The scanner code 706 may scan the virtual screen buffer 708 for changes in the graphical data. Similar to the comparison performed by the capture engine 132, the scanner code 706 may analyze the virtual screen buffer 708 for blocks of graphical data that have changed. Specifically, the scanner code 706 may calculate CRC values for each of the blocks and store the CRC values in its own CRC table 711. The scanner code 706 then compares the calculated CRC values with previously stored CRC values. If the CRC values match, then the block has not changed. However, if the CRC values do not match, then scanner code 706 may provide the block of graphical data to the compression code 140, encoder code 142, encryption code 144, and transmission code 146 for further processing, as discussed above. The exemplary processing of the graphical data in the remote management controller 60B is shown in greater detail in FIGS. 9A and 9B.

Figure 9A:
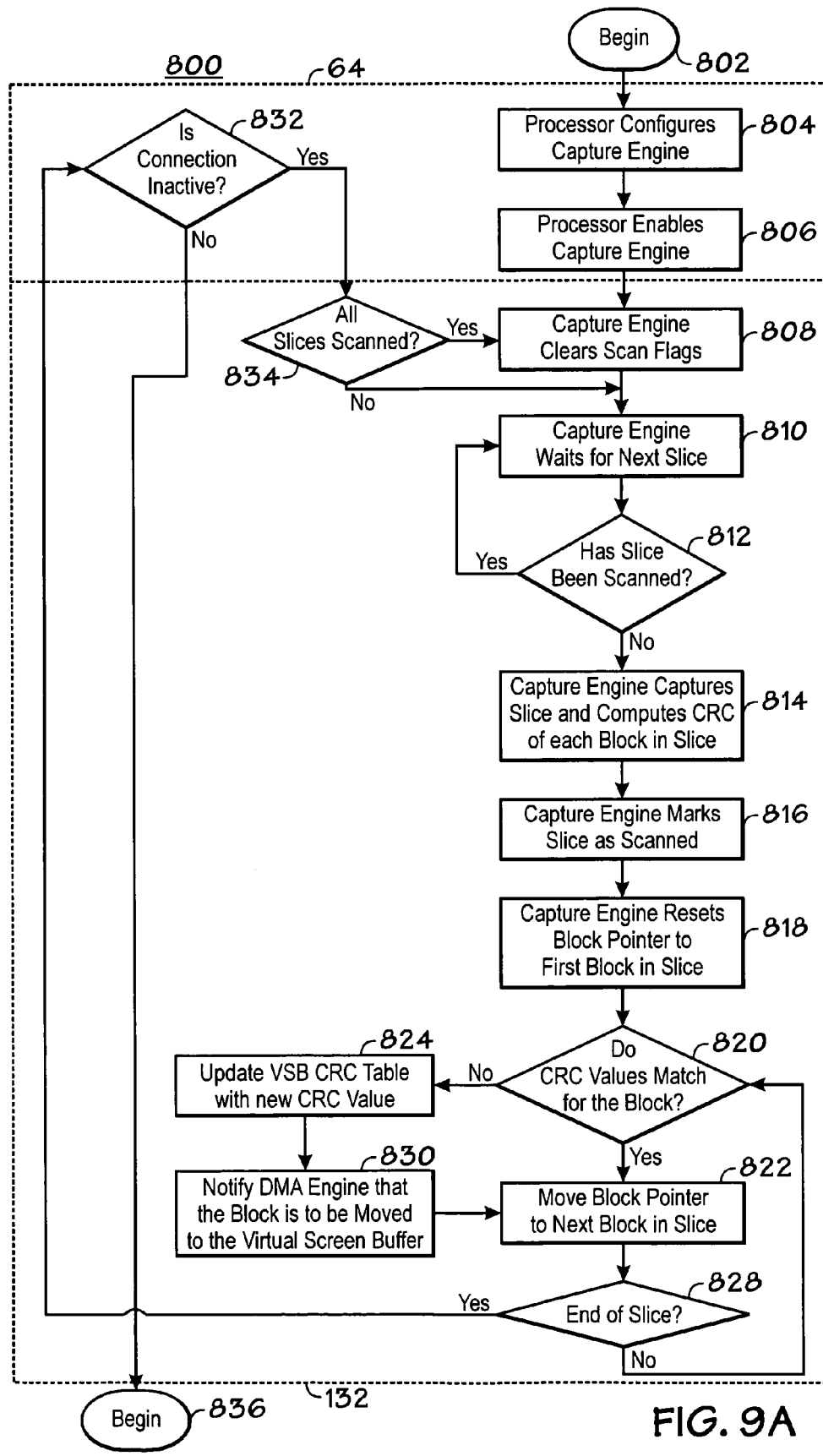
FIGS. 9A and 9B are process flow diagrams illustrating the use of the remote management controller of FIG. 8 in accordance with an exemplary embodiment of the present invention.
Figure 9B:
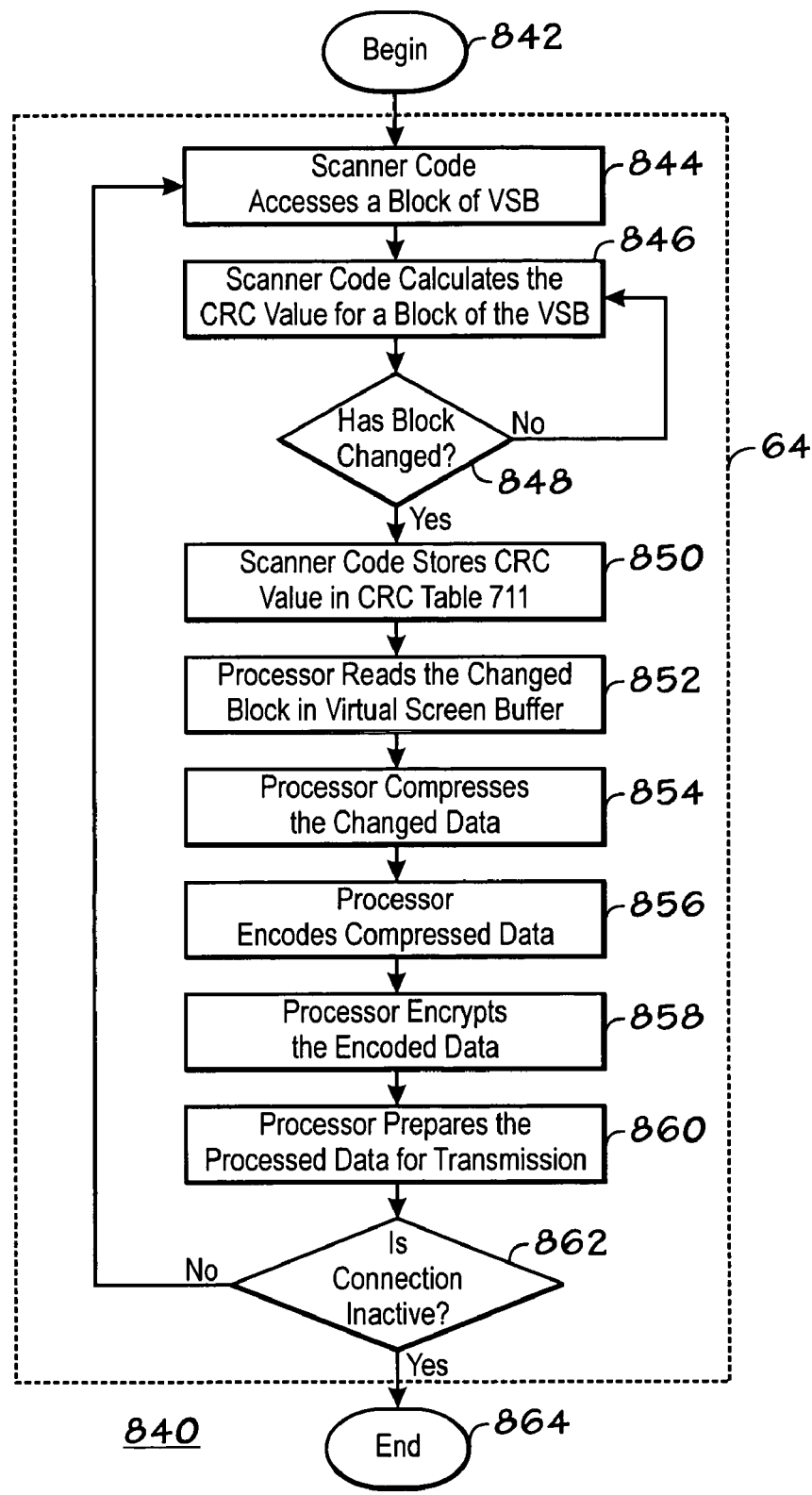

FIGS. 9A and 9B are process flow diagrams illustrating the exemplary use of the remote management controller 60B of FIG. 8. In FIG. 9A, the process flow diagram of the capture engine 132 is generally referred to by reference numeral 800. The process begins at block 802. In block 804, the processor 64 configures the capture engine 132. The configuration may include informing the capture engine 132 of the location in the memory 76 of the VSB 708 and the VSB CRC table 710. The processor 64 then enables the capture engine 132 to begin capturing information at block 806. Then, the capture engine 132 clears the scanned slice flags, which may be stored in the previous scan register 616, as shown in block 808.

Once the scanned flags are cleared, the capture engine 132 may wait for the next slice to be captured, as shown in block 810. Instead of the processor 64 initializing a slice capture as discussed above, the capture engine 132 initiates a slice capture in response to the DMA engine 704 finishing a previous slice. Once a new slice is indicated, the capture engine 132 determines whether the slice has been scanned previously, as shown in block 812. This may include examining the bits within the previous scan register 616 to determine the slices that are previously scanned. If the slice has been previously scanned, then the capture engine 132 waits for the next slice, as shown in block 810.

However, if the slice has not been previously scanned, then the capture engine 132 may capture and process the blocks of graphical data within the slice in blocks 814-818. At block 814, the capture engine 132 captures a slice and computes the CRC for each block in the slice. At block 816, the capture engine 132 marks the slice as having been scanned. Marking or changing the bit setting in the previous scan register 616 may be utilized to indicate that the slice has been scanned. Then, the block pointer may be reset to the first block in the slice, as shown in block 818.

At block 820, the capture engine 132 may compare the CRC block in the capture CRC table 150 to the previous value for that block stored in the VSB CRC table 710. If the CRC values match, then the capture engine 132 may move the block pointer to the next block within the designated slice, as shown in block 822. However, if the CRC values do not match, then the capture engine 132 may indicate to the DMA engine 704 to update the VSB CRC table 710 with the new CRC value from the capture CRC table 150, as shown in block 824. The DMA engine 704 may be notified that it may move the block to the VSB 708, as shown in block 830. Then, the capture engine 132 may move the block pointer to the next block within the designated slice, as shown in block 822. With the block pointer updated, the capture engine 132 may determine whether the block is at the end of the slice, as shown in block 828. If the block is not at the end of the slice, then the capture engine 132 may compare the CRC values for the next block of graphical data at block 820.

Once the slice has been analyzed by the capture engine 132, a determination is made to whether the remote management system connection is active or inactive, as shown in block 832. This determination may be made by the processor 64. If the remote management system connection is active, the capture engine 132 may determine whether each of the slices in the video frame buffer have been scanned, as shown in block 834. If the slices have been scanned, the capture engine 132 may clear the scanned slice flags, as shown in block 808. However, if the slices have not been scanned, the capture engine 132 may wait for the next slice, as shown in block 810. Regardless, if the remote management system connection is inactive, the process may end at block 836.

FIG. 9B is a process flow diagram of the processor 64 analyzing blocks of the virtual screen buffer 708 for changes to reduce the amount of graphical data that is communicated across the network M. In FIG. 9B, the process flow diagram is generally referred to by reference numeral 840. It should be understood that the operation of the capture engine 132 described in regard to FIG. 9A and the operation of the processor 64 described in regard to FIG. 9B may continue in parallel.

The process of FIG. 9B begins at block 842. At block 844, the scanner code 706 may access a block of the virtual screen buffer 708. Then, at block 846, the scanner code 706 may calculate the CRC values for a block in the virtual screen buffer 708. At block 848, the scanner code 706 may determine whether each of the blocks have changed in the virtual screen buffer 708. The determination may be similar to the discussion of block 414, which results from comparing the calculated CRC value of a block with the stored CRC values in another CRC table. If the block has not changed, the scanner code 706 may calculate the CRC value for the next block in the VSB 708, as shown in block 846. However, if the block has changed, then the scanner code 706 may store the updated CRC value in another CRC table 711 as shown in block 850. Once stored, the scanner code 706 may provide or notify the other code, such as the compression code 140, the encoder code 142, the encryption code 144, and the transmission code 146, to further process the changed block similar to the discussion of blocks 416-430, as shown in blocks 852-860. Then, the management code 138 may determine whether the remote management system connection is inactive, as shown in block 862. If the remote management system connection is active, the management code 138 may indicate that the scanner code may continue to analyze the virtual screen buffer 708, as shown in block 844. However, if the remote management system connection is inactive, the process may end at block 864.

Figure 10:
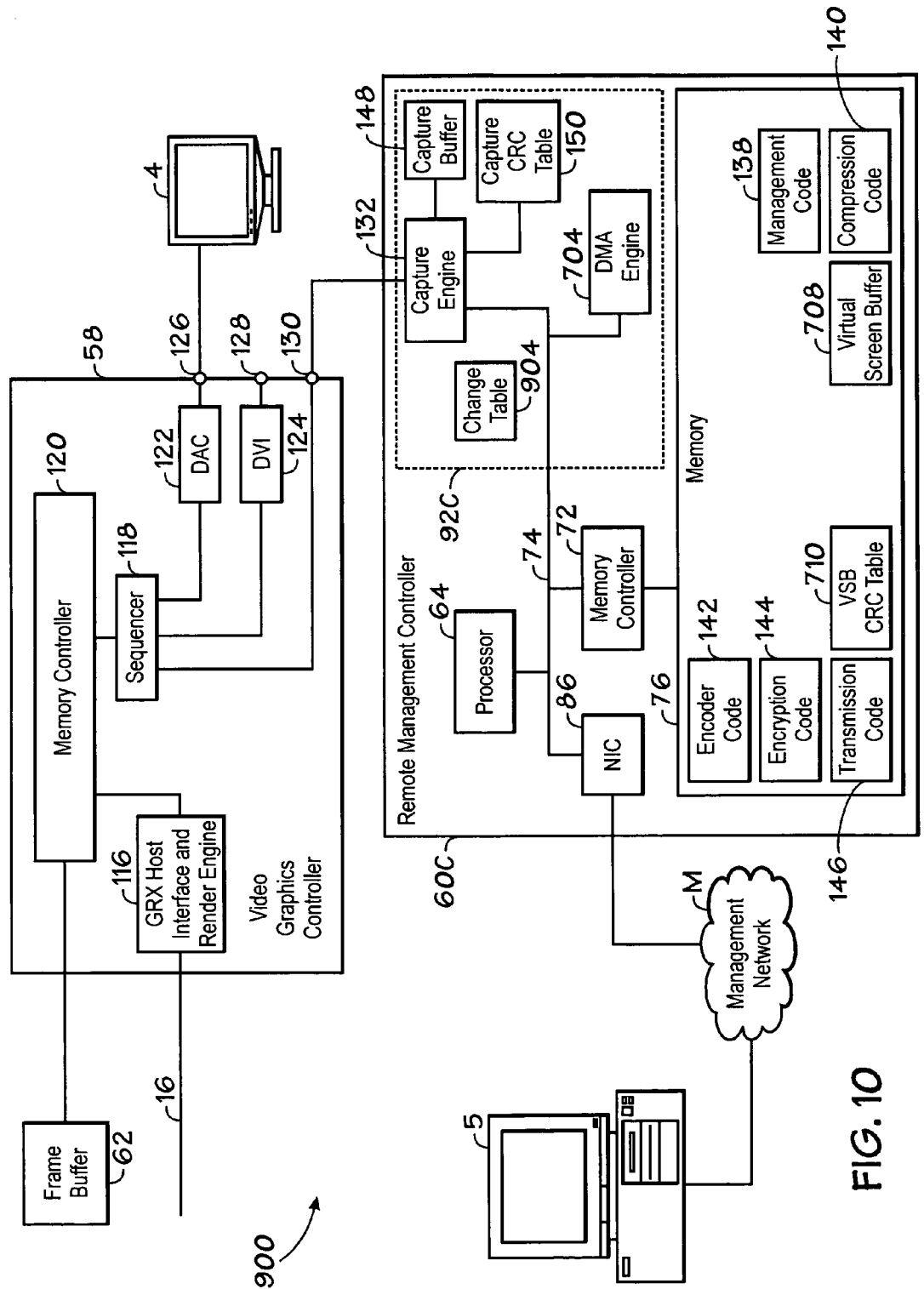
FIG. 10 is a functional block diagram of a second alternative exemplary remote management controller and video graphics controller of FIG. 2 in accordance with an embodiment of the present invention.

FIG. 10 illustrates a functional block diagram of a second alternative exemplary embodiment of a remote management controller 60C and video graphics controller 58 of the managed system 2 of FIG. 2. In this diagram 900, the remote management controller 60C may include a change table 904 to manage the access to the virtual screen buffer 708. Specifically, the change table 904 indicates the status of the blocks of graphical data as being changed or unchanged. Thus, the processor 64 can determine which portions of the VSB 708 have changed since the last time such portions of the VSB 708 were interrogated. In other words, the use of the change table 904 enables the processor 64 to determine whether a block has been modified merely by accessing the change table 904 instead of re-calculating CRC values for each of the blocks in the virtual screen buffer 708.

It should be understood that the code and components of the present embodiment may operate in a similar manner to those discussed above in FIGS. 4 and 8. For instance, the video graphics controller 58 may include various components 116, 118, 120, 122 and 124, and nodes 126, 128 and 130, which may operate as discussed above with regard to FIG. 4. Also, the remote management controller 60C may include the capture engine 132, the DMA engine 704, various code 138, 140, 142, 144, and 146, the capture buffer 148, capture CRC table 150, memory controller 72, and virtual screen buffer 708 and virtual CRC table 710 in the memory 76, which may operate as discussed above with regard to FIGS. 4 and 8.

However, to provide enhanced functionality, the remote management controller 60C may include a change mechanism, such as the change table 904, to control the access to and manage the changes in the virtual screen buffer 708. The processor 64 and capture engine 132 may toggle bits within the change table 904 to indicate that the blocks of graphical data in the virtual screen buffer 708 have been changed or are unchanged. Specifically, the capture engine 132 may set the bits to indicate a change and the processor 64 may clear the bits to acknowledge a change. Accordingly, the processor 64 may efficiently read these "changed" bits in the change table 904 to determine whether the blocks have changed, access the corresponding blocks of changed graphical data in the VSB 708, and clear the changed bit when the blocks of changed graphical data have been processed. The access between the processor 64 and/or capture engine 132 to the change table 904 may be through a 32-bit interface, for example. This 32-bit interface provides access to the status of 32 blocks of data with each read from the change table 904. As such, the processor 64 may identify changes within a virtual screen buffer 708 and may circumvent graphical data synchronization issues by "locking out" certain regions of video screen buffer 708 from being updated, while the changed blocks are being interrogated by the processor 64.

For example, to represent the status of each block in the virtual screen buffer 708, the change table 904 may include "n" blocks per slice by "m" slices by 1 bit for each block in the virtual screen buffer 708. For the virtual screen buffer 708, a change table 904 of 128×128×1 bits or 16,384 bits of data may represent the entire virtual screen buffer 708. In the change table 904, a bit that is set to the value of "0" may indicate that the block is unchanged. When the graphical data in a block is changed, the corresponding bit in the change table 904 may be set to the value of "1." As a result, the change table 904 may associate each block of graphical data in the virtual screen buffer 708 with a specific bit that indicates the status of the block.

The present technique uses an automatic lockout mechanism so that when the processor 64 reads from the change table 904, blocks that have been modified are "locked out." For example, if the processor 64 reads a 32-bit value from the change table 904, the DMA engine will be unable to update up to 32 blocks of the change table. Furthermore, neither the data in the VSB 708 or the corresponding CRC entry in the CRC table 710 may be updated. When the processor 64 is updating the change table 904, the processor 64 writes back the value it read from the change table after each modified block has been transmitted. For example, writing a "1" has the effect of clearing the corresponding bit in the change table 904. Furthermore, the write cycle also "unlocks" these blocks and allows them to be automatically updated once again.

Beneficially, the change table 904 enhances the operation of the remote management controller 60 by improving the efficiency of the change processing. For instance, the use of the change table 904 reduces the computational complexity in determining the changed blocks within the virtual screen buffer 708. That is, the change table 904 enhances the operation of the remote management controller 60 by reducing the processing time through the simplification of identifying changed blocks of graphical data. More specifically, it is believed that the change table 904 may improve the change determination by about an order of magnitude.

Figure 11A:
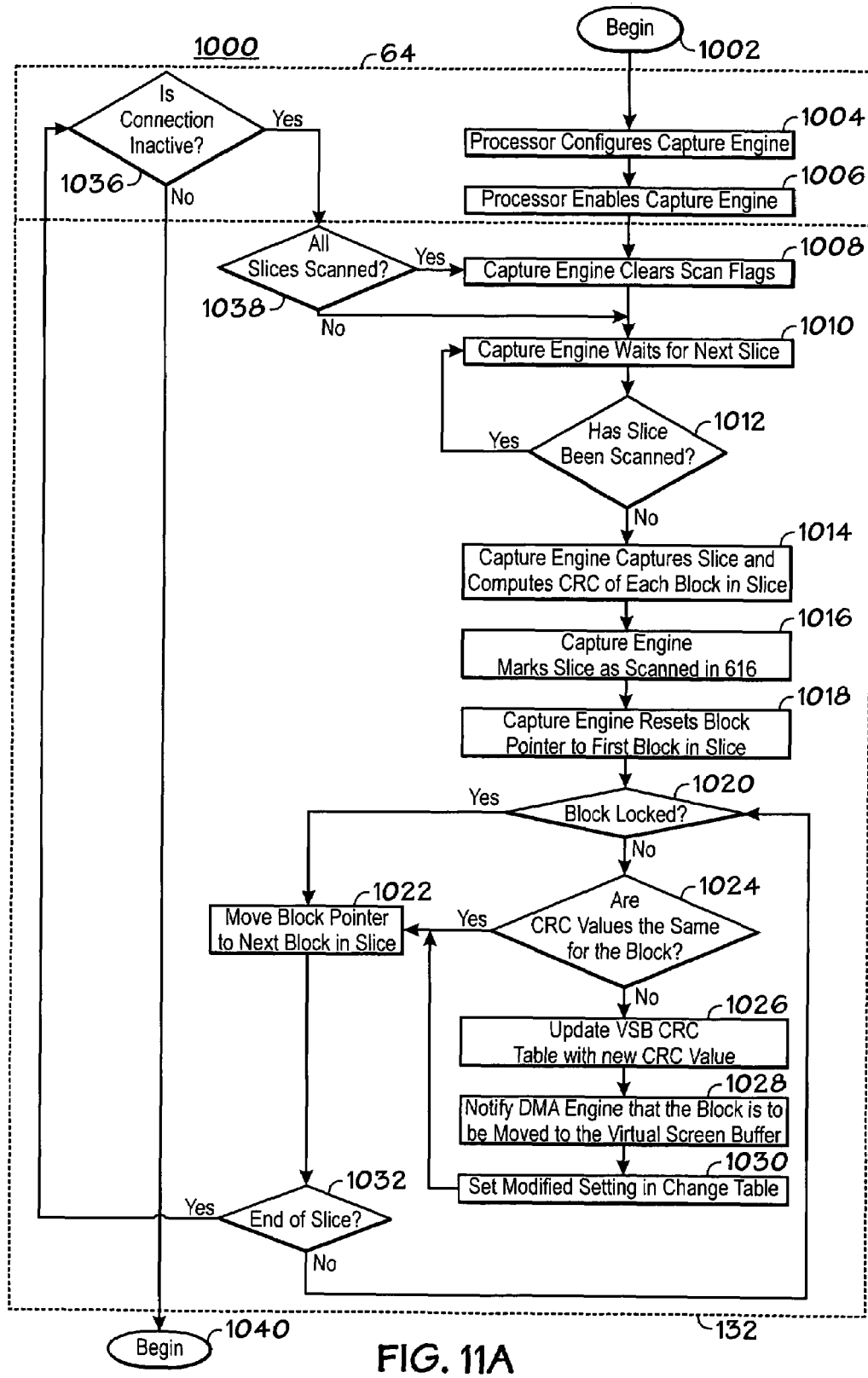
FIGS. 11A and 11B are process flow diagrams illustrating the use of the remote management controller of FIG. 10 in accordance with an exemplary embodiment of the present invention.
Figure 11B:
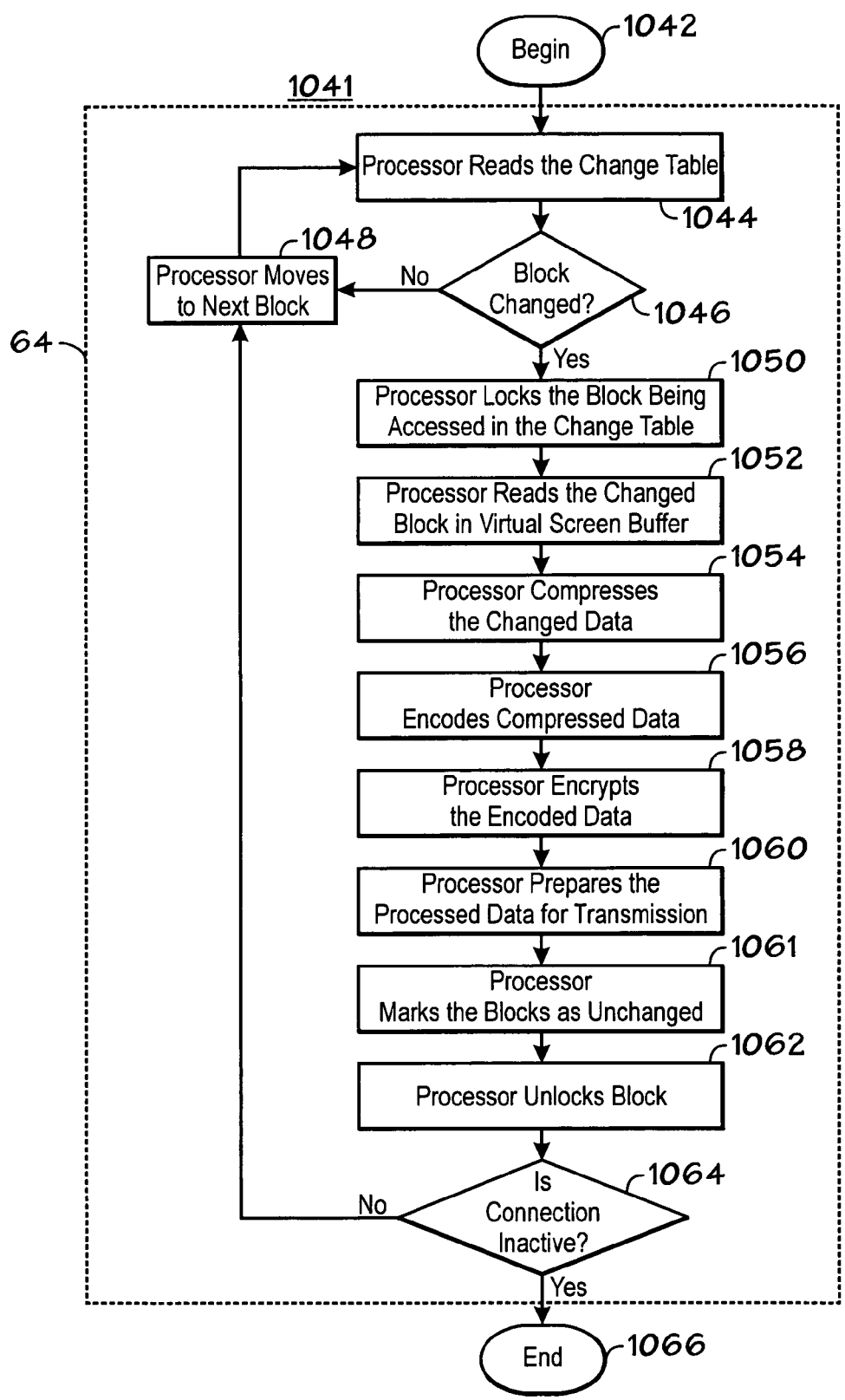

The exemplary processing of the graphical data in the remote management controller 60C is shown in greater detail in FIGS. 11A and 11B. FIGS. 11A and 11B are process flow diagrams illustrating the exemplary use of the remote management controller 60C of FIG. 10. In FIG. 11A, the capture engine 132, processor 64, and DMA engine 704 may process different blocks within designated slices. In this process flow diagram, which is generally referred to by reference numeral 1000, the present embodiment may operate in a similar manner to those discussed above in FIGS. 5, 9A and 9B. However, in this flow diagram 1000, the processor 64 and capture engine 132 may manage the access to the virtual screen buffer 708 by utilizing the change table 904 to reduce conflicts in accessing the virtual screen buffer 708.

The process begins at block 1002. The blocks 1004-1018 operate in a similar manner to the respective blocks 804-818 of FIG. 9A. For instance, at blocks 1004 and 1006, the processor may configure and enable the capture engine 132 to access a slice. Once the capture engine 132 has captured the slice, the capture engine 132 clears the scan flags and waits for the next unscanned slice, as shown in blocks 1008, 1010, and 1012. Once the capture engine 132 has located an unscanned slice, it may capture it and may calculate the CRC values for the blocks of the slice in block 1014. Then, the capture engine 132 may mark the slice as scanned and reset the block pointer to the first block in the slice, as shown in blocks 1016 and 1018.

Next, the DMA engine 704 may determine if the block has been locked by the processor 64, as shown in block 1020. If the block is locked, the DMA engine may skip this block and proceed to the next block by moving the block pointer to the next block in the slice, as shown in block 1022. If the pointer reaches the end of the slice, the process flow moves to block 1036 where the connection is determined to be active or inactive, as generally described previously. If a block pointer has not reached the end of the slice, then the process set forth in block 1020 is repeated.

However, if the block is not locked, then the DMA engine 704 may compare the CRC value in the capture CRC table 150 to the previous value stored in the VSB CRC table 710, as shown in block 1024. If the CRC values match, then the DMA engine 704 may move the block pointer to the next block within the designated slice, as shown in block 1022. However, if the CRC values do not match, then the DMA engine 704 may update the VSB CRC table 710 with the new CRC value from the capture CRC table 150, as shown in block 1026. The DMA engine 704 may then move the block contents from the capture buffer 148 to the proper location within the VSB 708, as shown in block 1028. Also, the capture engine 132 may set the modified bit within the change table 904 to indicate that the graphical data in that block has changed. This may involve toggling the bit setting within the change table 904. Then, the DMA engine 704 may move the block pointer to the next block within the designated slice, as shown in block 1022. With the block pointer updated, the DMA engine 704 may determine whether the block is at the end of the slice, as shown in block 1032. If the block is not at the end of the slice, then the DMA engine 704 may determine if the next block is locked at block 1020. However, if the block is the end of the slice, then the DMA engine 704 notifies the capture engine 132 to possibly obtain another slice, as shown in block 1036.

Once the slice has been analyzed by the DMA engine 704, a determination is made to whether the remote management system connection is active or inactive, as shown in block 1036. This determination may be similar to the determination made in block 832 of FIG. 9A. If the remote management system connection is active, the capture engine 132 may determine whether all slices have been scanned, as shown in block 1038. If the slices have been scanned, the capture engine 132 may clear the scanned slice flags, as shown in block 1008. However, if the slices have not been scanned, the capture engine 132 may wait for the next slice, as shown in block 1010. Regardless, if the remote management system connection is inactive, the process may end at block 1040.

In FIG. 11B, the processor 64 may process different blocks within the virtual screen buffer 708 by utilizing the change table 904. In this process flow diagram, which is generally referred to by reference numeral 1041, the present embodiment may operate in a similar manner to the blocks discussed above. Specifically, the change table 904 may indicate the changed blocks in the virtual screen buffer 708 to expedite the processing of changed blocks. In this flow diagram 1041, the processor 64 may manage the access to the virtual screen buffer 708 by utilizing the block lock out feature change table 904 to reduce any conflicts with accesses to the virtual screen buffer 708 by the capture engine 132 or DMA engine 704.

The process begins at block 1042. In this diagram 1041, the processor 64 may access a change table 904 to determine if specific blocks of the virtual screen buffer 708 have changed, as shown in block 1044. This use of the change table 904 by the processor 64 prevents the processor 64 from having to analyze unchanged portions of the data in the VSB 708. At block 1046, the processor determines if the block has been modified. Similar to the discussion above, the determination of the blocks being modified may be based on the setting that corresponds to the block in the change table 904. For instance, bits set to "0" may indicate that the blocks are unchanged and bits set to "1" may indicate that the blocks are changed. If the block is not changed, then the processor moves to the next block, as shown in block 1048.

However, if the setting in the change table 904 indicates a change in the block, then the block is processed. To begin, at block 1050, the processor 64 locks the block. This prevents the DMA engine 704 from overwriting the contents of the block in the VSB 708. Following the locking of the block, the processor 64 processes the block as shown in blocks 1052-1060, which is similar to the discussion of blocks 852-860 in FIG. 9B. Once the graphical data is processed, the processor 64 marks the block as unchanged at block 1061 and unlocks the block of graphical data at block 1062. At block 1064, the processor 64 may determine if the remote management system connection is inactive. If the remote management system connection is active, the processor 64 may move to the next block at block 1048. Furthermore, when the processor 64 has evaluated all of the blocks in the VSB 708, it may start over at the first block. However, if the remote management system connection is inactive, the process may end at block 1066.

The third exemplary embodiment enables the construction of network packets that may be directly processed and placed into a network buffer for direct access by a communication device, such as the NIC 86. For example, the technique may place the processed data into a data payload of a network buffer and calculate a checksum for the processed data. Then, the processor 64 or NIC 86 may be notified to transmit the processed data in the network buffer.

Figure 12:
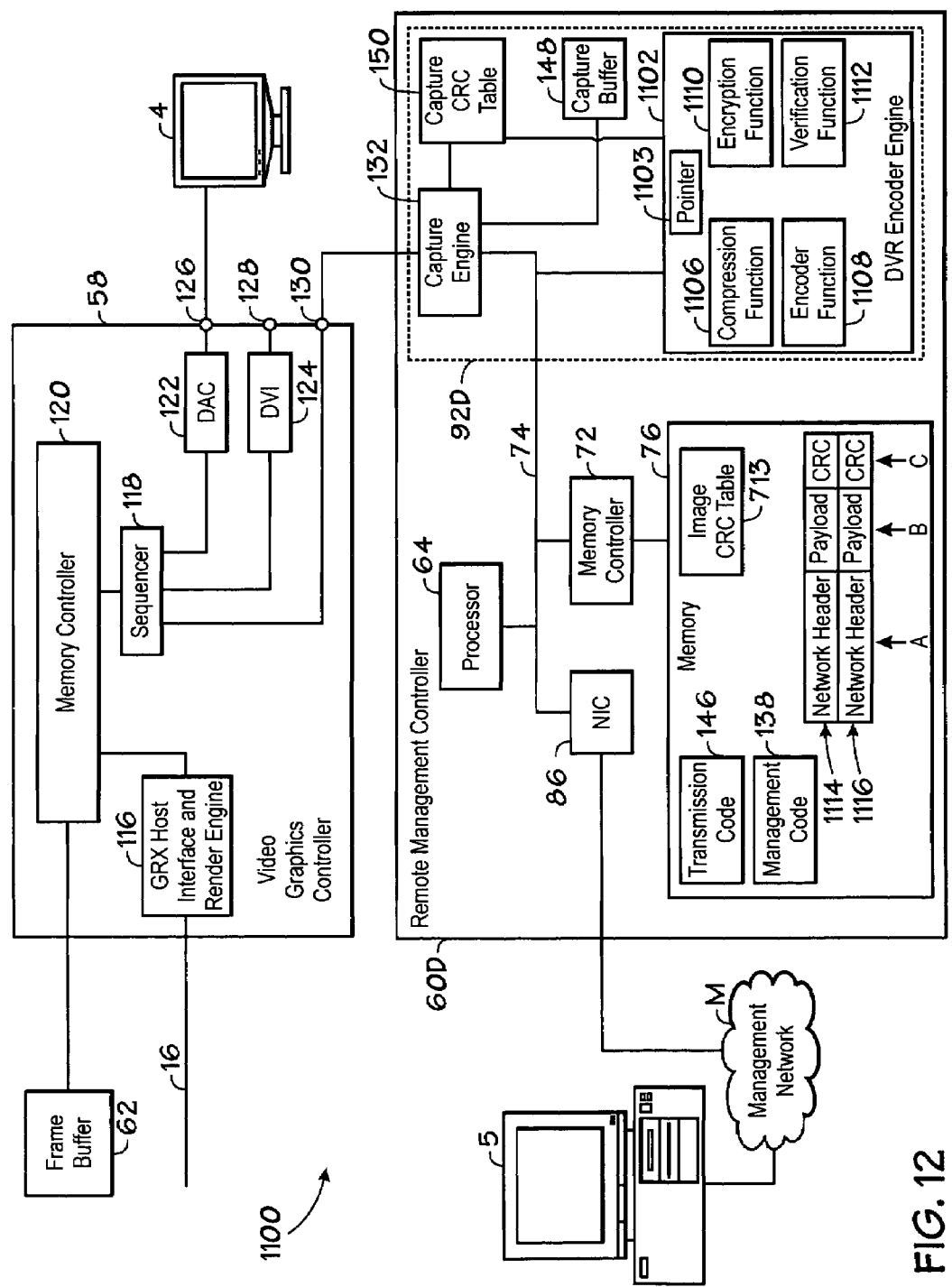
FIG. 12 is a functional block diagram of a third alternative exemplary remote management controller and video graphics controller of FIG. 2 in accordance with an embodiment of the present invention.

FIG. 12 illustrates a functional block diagram of the third alternative exemplary embodiment of a remote management controller 60D and video graphics controller 58 of the managed system 2 of FIG. 2. In this diagram 1100, the remote management controller 60D may include a DVR encoder engine 1102 to analyze the designated slice of graphical data. The DVR encoder engine 1102 may include a compression function 1106, an encoder function 1108, an encryption function 1110, and a verification function 1112, which are utilized to process the graphical data in the designated slice. After the graphical data is processed, the DVR encoder engine 1102 may place any processed data into one or more network buffers 1114 and 1116 to form data packets. Then, when each of the data packets is full or the data is stale, the DVR encoder engine 1102 may notify the NIC 86 or the processor 64 that the data in one or more of the network buffers 1114 and 1116 is ready for transmission to the remote management system 5.

The code and components of the third embodiment may operate in a similar manner to those discussed above in FIGS. 4 and 8. For instance, the video graphics controller 58 may include various components 116, 118, 120, 122 and 124, and nodes 126, 128 and 130, which may operate as discussed above with regard to FIG. 4. Also, the remote management controller 60D may include the capture engine 132, the management code 138, transmission code 146 and the VSB CRC table 710 in the memory 76 along with the capture buffer 148 and capture CRC table 150 associated with the capture engine 132, which may operate as discussed above with regard to FIGS. 4 and 8. Further, the compression function 1106, encoder function 1108, and encryption function 1110 may be similar to the compression code 140, encoder code 142, and encryption code 144 of FIGS. 4 and 8, respectively.

However, to more efficiently process the graphical data in the designated slices, the remote management controller 60D may include a DVR encoder engine 1102. The DVR encoder engine 1102 may analyze the graphical data in the capture buffer 148 and place the data into a network buffer 1114 or 1116 for the NIC 86 to transmit the changed graphical data. In this embodiment, the processor 64 uses the transmission code 146 to allocate and manage one or more network buffers 1114 and 1116 that are directly accessible by the DVR encoder engine 1102. The network buffers 1114 and 1116 include network header fields 1114A and 1116A, payload fields 1114B and 1116B, and CRC fields 1114C and 1116C. As an example, the network header field 1114A is filled out by the transmission code 146 with network information. The network information may include transmission control protocol/Internet protocol ("TCP/IP") data that specifies the source and destination of the data packet, for instance. The network header field 1114A may be 14 bytes in length. The processor 64 may calculate a portion of the CRC field 1114C for the network header field 1114A by executing the transmission code 146.

To operate, the processor 64, which may execute the transmission code 146, allocates additional network buffers 1114 and 1116 for the DVR encoder engine 1102 which includes a register or pointer 1103 to the allocated network buffer. The transmission code 146 may notify the DVR encoder engine 1102 of the data payload field 1114B size and location for the data to be placed. The notification may include setting a register with the starting location of the data payload field 1114B along with the maximum size. Further, the DVR encoder 1102 calculates a portion of the CRC field 1114C for the payload field 1114B and provides this value to the processor 64. The CRC values for the payload field may be calculated by the verification function 1112, which is discussed below. This eliminates the need for the processor 64 to have to access any data in the payload field 1114B. The processor 64 completes the calculation of CRC field 1114C using the partial calculations of the CRC for the network header field 1114A and the data payload field 1114B. Further, the processor 64 may notify the NIC 86 to send the data buffer 1114 or 1116 via the network N or M. The notification may result from the DVR encoder engine 1102 generating an interrupt to the processor 64 when the network buffer 1114 and 1116 is full or may be based on the expiration of a timer (i.e. the data is stale).

The DVR encoder engine 1102 may detect changes in the graphical data placed in the capture buffer 148 and further process the graphical data, as discussed above. For instance, the DVR encoder engine 1102 determines whether the data within the block has been modified. The determination is made by comparing the calculated CRC value in capture CRC table 150 with the previously calculated CRC value of the specific block that is located in the image CRC table 710. It should be noted that this embodiment does not include a shadow copy of the image display on the remote monitor 8 in a virtual screen buffer, as did the embodiments illustrated in FIGS. 8 and 10. Nevertheless, this embodiment does use the image CRC table 713 which is similar to the VSB CRC table 710.

Further, the DVR encoder engine 1102 may include a compression function 1106, an encoder function 1108, an encryption function 1110 and a verification function 1112. The functions 1106, 1108, 1110, and 1112 modify the changed data for transmission in a similar manner to the code discussed above. To enhance efficiency, the unchanged graphical data and changed graphical data may be handled differently. For instance, unchanged graphical data may be dropped and another block analyzed for any possible changes. However, for the changed data, the DVR encoder engine 1102 may provide notification or process the changed data with the other functions 1106-1112 within the DVR encoder engine 1102.

Unlike the previous embodiments in which the processor 64 compressed, encoded, and/or encrypted the data and then formed the data into a packet suitable for transmission over the network, the present embodiment relieves the processor 64 of the duties regarding the processing of the data portion of the packet. Rather, this functionality is built into the DVR encoder engine 1102, as illustrated by the compression function 1106, the encoder function 1108, the encryption function 1110, and the verification function 1112. Specifically, the DVR encoder engine 1102 calculates the CRC for the data portion of the packet and loads it into a register so that it may be accessed by the processor 64, which can then combine this value with the CRC for the header to generate the final CRC for the packet. This greatly accelerates packet processing and removes throughput constraints related to how fast the processor 64 can access its memory 76.

Once the fully processed data packet is placed into the network buffer 1114, the transmission code 146 may notify the NIC 86 that the network buffer 1114 is ready for transmission over the management network M. For instance, the transmission code 146 may signal the NIC 86 that the data in the network buffer 1114 is ready for transmission to the remote management system 5. Then, the NIC 86 may start transmitting the data in the network buffer 1114 to the remote management system 5. The DVR encoder engine 1102 may not send additional changed graphical data to the network buffer 1114 until the NIC 86 has transmitted the data successfully to the remote management system 5. However, the DVR encoder engine 1102 may be configured to utilize one or more network buffers, such as another network buffer 1116, when one network buffer 1114 is being transmitted to the remote management system 5. Once the transmission is complete, the DVR encoder engine 1102 may be signaled to start processing captured data to the network buffer 1114, while the DVR encoder engine 1102 fills the buffer 1116. In this embodiment, it should be noted that there may be buffers in addition to the buffers 1114 and 1116, and that the number of buffers may be selected to ensure that at least one buffer is always available to be filled by the DVR encoder engine 1102. It should also be noted that hardware support may not be provided for all buffers in this embodiment and that the remaining buffers may be provided in software. For example, in this embodiment, one hardware buffer may be provided, with the remaining buffers being provided in software.

Beneficially, the DVR encoder engine 1102 enhances the performance of the system. For instance, the DVR encoder engine 1102 reduces the involvement of the processor 64 in handling the movement of the graphical data and processing the graphical data. Thus, the processor 64 is free to handle other tasks for the managed system. Furthermore, it should be clear from the above description that the delivery of data packets over the network will determine how frequently the DVR encoder engine 1102 receives buffers. When more network bandwidth is available, the DVR encoder engine 1102 will stall less frequently waiting for available network buffers. This, in turn, decreases the amount of time the capture engine 132 is stalled waiting for the DVR encoder engine 1102 to finish analyzing a slice. Thus, the capture engine is able to capture more slices per second, thus translating into a higher refresh rate for the monitor 8 associated with a remote management system 5. Conversely, when less network bandwidth is available, the resulting refresh rate for the monitor 8 associated with a remote management system 5 will be reduced.

Figure 13A:
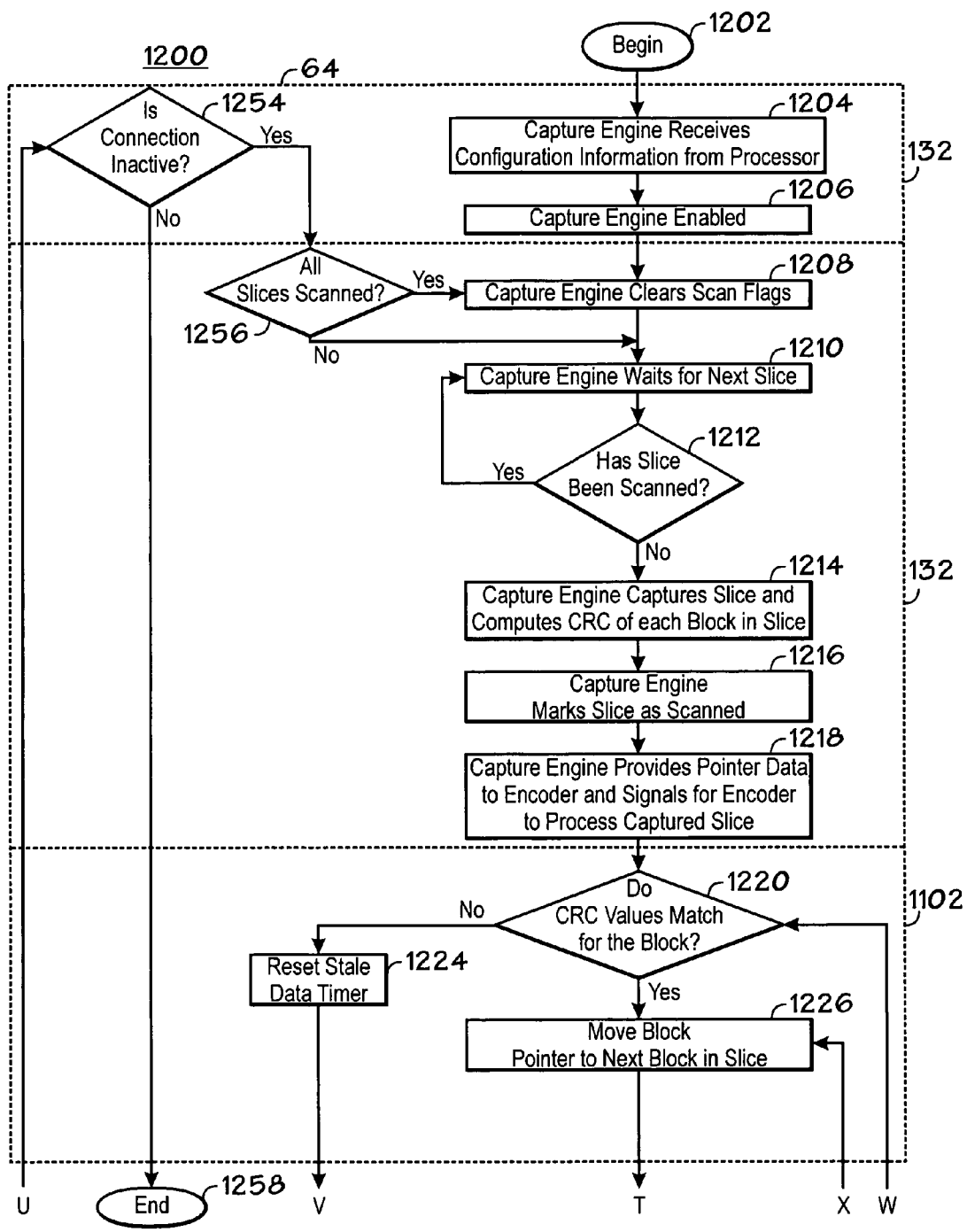
FIGS. 13A, 13B and 13C are process flow diagrams illustrating the use of the remote management controller of FIG. 12 in accordance with an exemplary embodiment of the present invention.
Figure 13B:
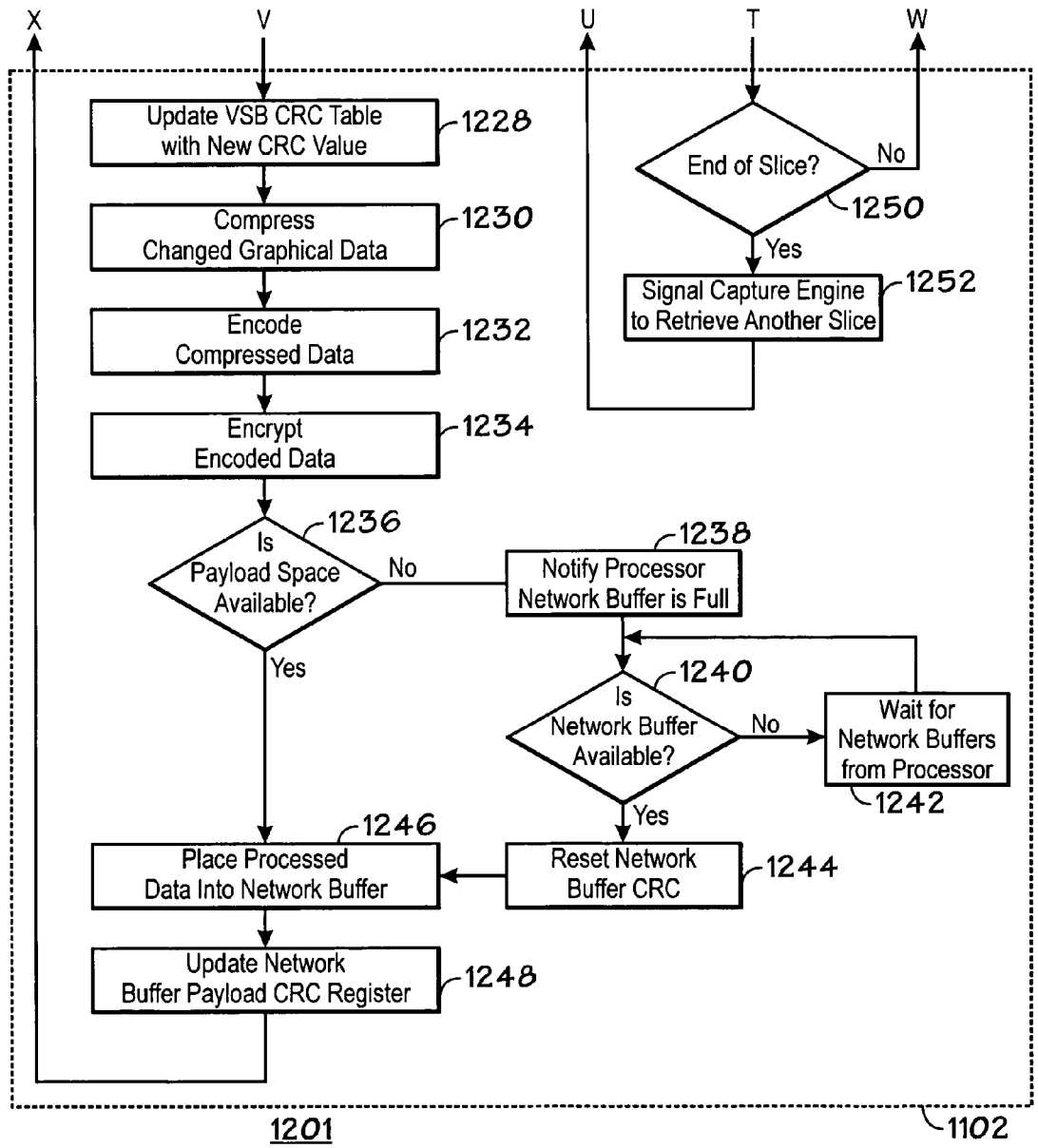
Figure 13C:
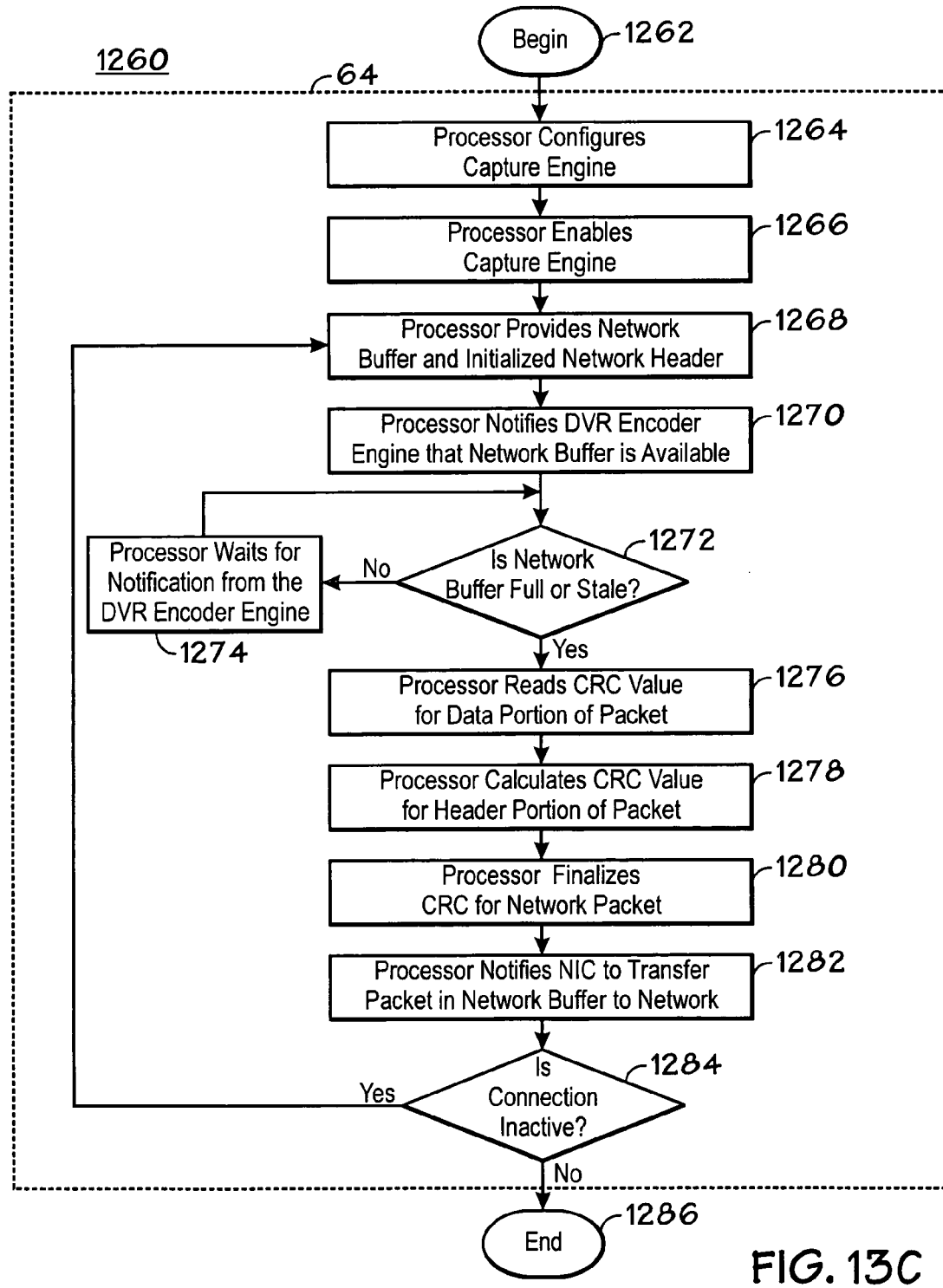

The exemplary processing of the graphical data in the remote management controller 60D is shown in greater detail in FIGS. 13A, 13B and 13C. FIGS. 13A, 13B and 13C are process flow diagrams illustrating the exemplary use of the remote management controller 60D of FIG. 12 in accordance with the third embodiment. Specifically, FIGS. 13A and 13B illustrate an exemplary process performed by the digital video redirection module 92D, and FIG. 13C illustrates an exemplary process performed by the processor 64. The process flow diagrams are generally referred to by reference numerals 1200, 1201, and 1260, respectively. In the process flow diagrams 1200 and 1201, the present embodiment may operate in a similar manner to those discussed above in FIGS. 4, 8 and 10. However, as described in these flow diagrams 1200 and 1201, the DVR encoder engine 1102 may analyze the graphical data in the capture buffer 148, process the changed data, and place the processed data into a network buffer 1114 along with a CRC value associated with the processed data. Then, the processor 64 may complete and transmit the network buffer 1114 and 1116 to another device via the NIC 86.

The process of the digital video redirection module 92D begins at block 1202. The blocks 1204-1216 operate in a similar manner to the respective blocks 1004-1016 of FIG. 10. For instance, at blocks 1204 and 1206, the processor 64 may configure and enable the capture engine 132. Then, the capture engine 132 may clear the scan flags and wait for the next unscanned slice, as shown in blocks 1208, 1210, and 1212. Once the capture engine 132 has a slice, it may capture data into the capture buffer 148 and calculate the CRC values for the blocks of the slice in block 1214. At block 1216, the capture engine 132 may mark the slice as scanned, as discussed above. Then, the capture engine 132 signals the completion of the capture to the DVR encoder engine 1102, as shown in block 1218.

Once the capture engine has completed its processing of the graphical data, the DVR encoder engine 1102 may further process the graphical data. To begin, at block 1220, the DVR encoder engine 1102 compares the CRC value stored in the capture CRC table 150 with the previously stored CRC value in the image CRC table 713 to determine if the CRC values are different. If the CRC values for the current block are the same, the DVR encoder engine 1102 moves the block pointer to the next block within the slice, as shown in block 1226.

However, if the CRC values are different, the DVR encoder engine 1102 may reset the stale data timer, as shown in block 1224, and update the image CRC table 713 with the new CRC value from the capture CRC table 150, as shown in block 1228. It should be noted that the stale data timer is reset when data is written into a buffer, so that if nothing is written into the buffer by the time the timer expires, the buffer is deemed "stale" and scheduled for delivery via a NIC. Then, at block 1230, the compression function 1106 may compress the block of graphical data. At block 1232, the encoder function 1108 may encode the compressed data into a specific format to form encoded data. Then, the encryption function 1110 may encrypt the encoded data into a processed data portion of a packet, as shown in block 1234.

Beneficially, in this embodiment, once the graphical data has been processed, the DVR encoder engine 1102 may place the processed data into the network buffers 1114 or 1116, as shown in blocks 1236-1248. At block 1236, the DVR encoder engine 1102 may determine whether payload space is available in the network buffer 1114 or 1116. It should be noted that more than one slice of graphical data may be buffered before the NIC 86 transmits the graphical data to the remote management system 5. In other words, another buffer may be provided to the DVR encoder engine 1102 before the previous buffer has been processed by the processor 64. If network payload space is not available, then the DVR encoder engine 1102 may notify the processor at block 1238. The notification may be signaling the processor 64 to allocate more network buffers, for example. Then, the DVR encoder engine 1102 may determine whether a network buffer is available, as shown in block 1240. If a network buffer is not available, then the DVR encoder engine 1102 may wait for the processor 64 to present another network buffer, as shown in block 1242. Then, DVR encoder engine 1102 may again determine whether the network buffers are available at block 1240. If another network buffer is available, then the DVR encoder engine 1102 may reset the CRC value in the CRC register, as shown in block 1244. Accordingly, once the CRC is reset in block 1242 or the determination is made that payload space is available in block 1236, the processed data may be placed into the network buffer 1114 at block 1246. Then, the CRC value for the network buffer 1114 may be updated as shown in block 1248. The calculation of the CRC value may be completed by the verification function 1112 of the DVR encoder engine 1102, which finalizes the packetization of the data portion of the packet.

With the processed data placed into the network buffer, the DVR encoder engine 1102 may determine whether the block is the end of the slice at block 1250. If the block is not the end of the slice, the DVR encoder engine 1102 may continue to analyze the CRC values in block 1220, as discussed above. However, if the block is the end of a slice, then the DVR encoder engine 1102 may signal the capture engine 1102 to retrieve another slice, as shown in block 1252. Then, a determination is made as to whether the remote management system connection is active or inactive, as shown in block 1254. This determination may be made by the capture engine 132, or even the DVR encoder engine 1102, based on receiving a signal from the processor 64. If the remote management system connection is active, the capture engine 132 may determine whether all slices have been scanned, as shown in block 1256. If the slices have been scanned, the capture engine 132 may clear the scanned slice flags, as shown in block 1208. However, if the slices have not been scanned, the capture engine 132 may wait for the next slice, as shown in block 1210. Regardless, if the remote management system connection is inactive, the process may end at block 1258.

FIG. 13C is a process flow diagram of the processor 64 in the third alternative exemplary embodiment of a remote management controller 60D and video graphics controller 58 of FIG. 12. In this flow diagram, the processor 64 allocates one or more network buffers, such as network buffers 1114 and 1116, for the DVR encoder engine 1102 to fill with changed graphical data. Then the processor 64 finishes the CRC calculation and notifies the NIC 86 that to transfer the network buffer 1114 or 1116 to the network. The process begins at block 1262. At block 1264, the processor 64 allocates resources for the DVR encoder engine 1102 and configures the capture engine 132, as discussed above in block 1204 of FIG. 13A. Then, at block 1266, the processor 64 may enable the capture engine 132 to capture slices of graphical data.

The processor 64 may allocate and manage the network buffers 1114 and 1116, as shown in blocks 1268-1272. At block 1268, the processor 64 may allocate network buffers, such as network buffers 1114 and 1116, to the DVR encoder engine 1102 and initialize the network header associated with each of the network buffers 1114 and 1116. Then, the processor 64 may notify the DVR encoder engine 1102 that the network buffers are available, as shown in block 1270. This notification may be accomplished by providing the DVR encoder engine 1102 with the starting address and maximum packet length of the data payload buffer 1114B. At block 1272, the processor 64 may determine whether the network buffer is full or includes stale data. Stale data, as noted above, may include situations where the buffer is not full and data that has been present for a predetermined period of time. Accordingly, if the data within the network buffer is not stale and the network buffer is not full, then the processor may wait for the DVR encoder engine 1102 to notify the processor 64 that the network buffer is full or the data is stale. Once the processor 64 receives this notification, the processor 64 may further process the network buffers. Here, the notification may be provided by the DVR encoder engine 1102 sending an interrupt to the processor 64.

The processor 64 may further process the network buffers for transmission by preparing the network buffers for transmission, as shown in blocks 1276-1282. It should be noted that the processor 64 may make the second network buffer 1116 available to the DVR encoder engine 1102 before processing the first network buffer 1114. This allows the DVR encoder engine 1102 to proceed with filling the next buffer while the data in the first buffer is being finalized and transmitted. At block 1276, the processor 64 may read the network CRC value for the data payload portion of the network buffer from the DVR encoder engine 1102. Then, the processor 64 may calculate the network CRC value for the network header portion of the network buffer as shown in block 1278, although the network CRC value for the network header portion may have been previously calculated or otherwise provided by the processor 64. Using the partial CRC values, the processor 64 may complete the calculation of the CRC value for the entire network packet and supply this value to the end of the network buffer, as shown in block 1280. At block 1282, the processor notifies the NIC 86 to transfer the complete packet in the network buffer to the network. Then, the management code 138 may determine whether the remote management system connection is inactive, as shown in block 1284. If the remote management system connection is active, then the processor may provide another network buffer to the DVR encoder engine 1102, as shown in block 1268. However, if the remote management system connection is inactive, the process may end at block 1286.

Figure 14:
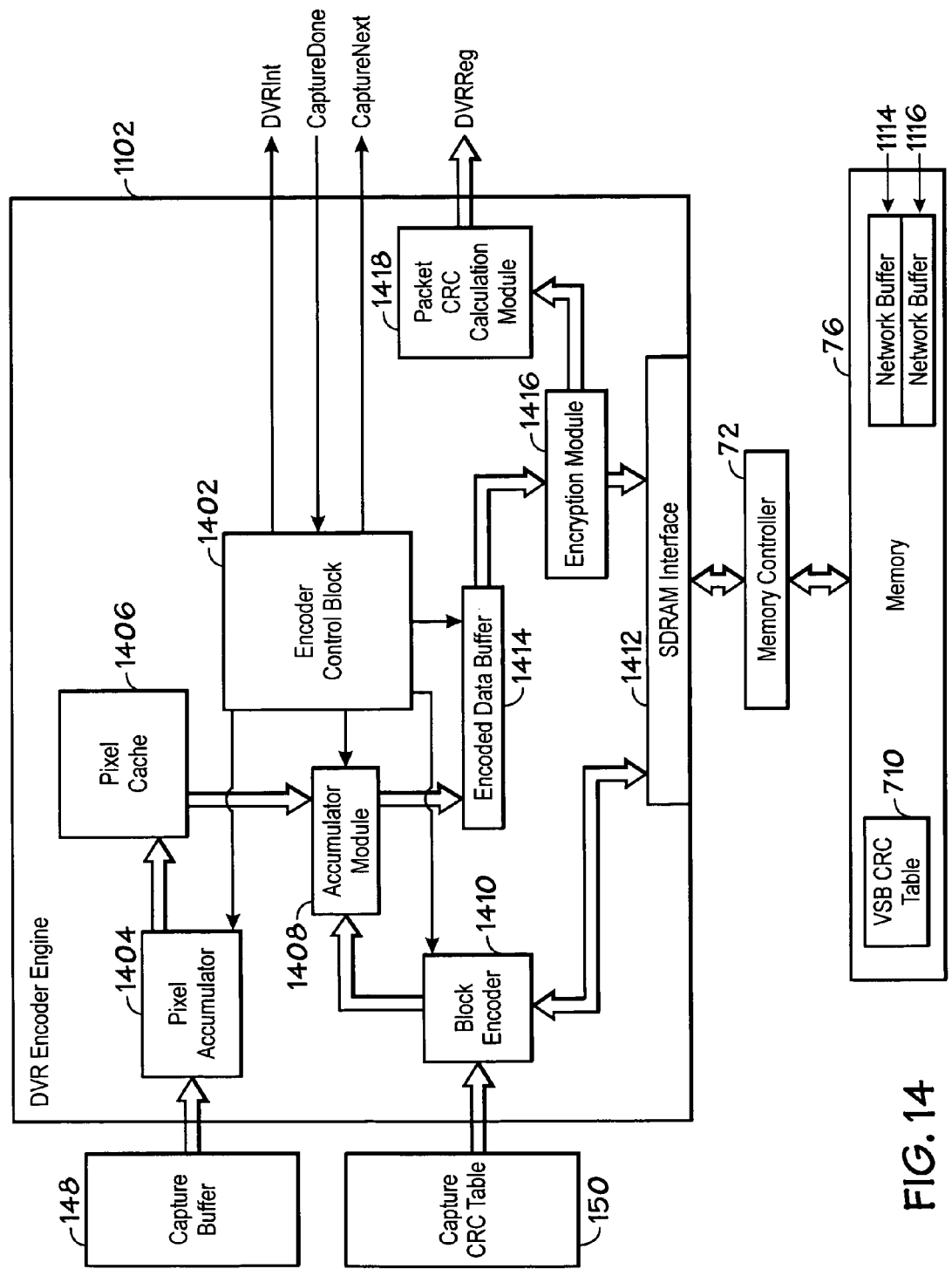
FIG. 14 is a block diagram illustrating an exemplary DVR Encoder Engine of FIG. 12 in accordance with an embodiment of the present invention.

FIG. 14 is a block diagram illustrating an exemplary DVR encoder engine 1102 of FIG. 12. In this embodiment, the DVR encoder engine 1102 may include logic and components to process the graphical data being provided from the capture engine 132. The DVR encoder engine 1102 may include an encoder control block 1402 that receives inputs from various logic to manage the interactions with the processor 64 and the capture engine 132 and processes the changed graphical data.

The encoder control block 1402 may manage the processing of the changed graphical data by exchanging signals with the capture engine 132 and the processor 64. To provide this functionality, the encoder control block 1402 may utilize the DVR interrupt signal DVRInt, the capture done signal CaptureDone, and the capture next slice signal CaptureNext. The DVR interrupt signal DVRInt may be utilized to notify the processor 64 that the network buffer 1114 is full, stale, or that other network buffers are needed. As discussed above, the capture done signal CaptureDone is transmitted from the capture engine 132 to the encoder control block 1402 to indicate that the current slice has been captured and is ready for processing. Accordingly, the capture next slice signal CaptureNext is generated by the encoder control block 1402 to the capture engine 132 to indicate that the processing of the previous slice is completed and that the next slice may be captured. In this manner, the capture engine 132 and the DVR encoder engine 1102 may notify each other when the respective functions are completed. That is, the capture engine 132 and the DVR encoder engine 1102 may manage the flow of data between each other without the intervention of the processor 64 and may be regulated by the network bandwidth or network buffers 1114 and 1116 that are utilized to transmit the changed graphical data.

Based on the control signals, other sources of incoming signals include the graphical data from the capture buffer 148. The graphical data from the capture buffer 148 is provided to the pixel accumulator 1404. The pixel accumulator 1404 divides the pixel data into even and odd pixels, which increases the bits on the bus and decreases the clock speed used for accessing the bits. The pixel accumulator 1404 provides the segmented graphical data to the pixel cache 1406. The pixel cache 1406 performs a second order compression on the segmented graphical data. The compression of the segmented graphical data may be based on the encode pixel signal that is provided from the encoder control block 1402, which may be based on different coding techniques or schemes. The compressed data is provided to an accumulator module 1408 that may receive the encoded graphical data along with the other operational codes based on data from the capture CRC table 150, which is discussed below.

Once the encoded graphical data and operational codes are provided to the accumulator module 1408, it packages these variable-sized bit values into word-sized values which are then provided to the encoded data buffer 1414. The encoded data buffer 1414 may include 128 bits of memory to store the encoded data before it is encrypted in the encryption module 1416. The encryption module 1416 may encrypt the encoded data to form processed data that may be stored in the data payload field 1114B of the network buffer 1114. Also, the encryption module 1416 may provide the processed data to the packet CRC calculation module 1418. The packet CRC calculation module 1418 may calculate the CRC values for the different data packets and store the associated calculated CRC values in the CRC field 1114C or may store the CRC values in the DVR registers for access by the processor 64 or NIC 86.

FIG. 15 illustrates a functional block diagram of a fourth alternative exemplary embodiment of a remote management controller 60E and video graphics controller 58 of the managed system 2 of FIG. 2 constructed in accordance with embodiments of the present invention. In this diagram 1500, the remote management controller 60E may obtain multiple designated slices to increase the number of slices that may be analyzed. The digital video redirection module 92E may include a capture engine 1502, multiple capture buffers 148₁-148₂, multiple capture CRC tables 150₁-150₂, and a DVR encoder engine 1510. Thus, by analyzing multiple designated slices for changes in the graphical data, the refresh or presentation rate of the graphical data provided to other systems may mirror the video image that may be obtained from a monitor that is directly connected to the managed system 2.

Accordingly, for exemplary purposes, the managed system 2 may include a capture engine 1502, multiple capture buffers 148₁-148₂, multiple capture CRC tables 150₁-150₂, a DVR encoder engine 1510, processor 64, memory controller 72, image CRC table 713, and memory 76. As such, the various code and components of the present embodiment may operate in a similar manner to those discussed above in FIGS. 4, 8 and 12. For instance, the monitor 4, remote management system 5, NIC 86, video graphics controller 58, frame buffer 62, and network M may operate, as discussed above with regard to FIG. 4. Also, the capture buffers 148₁-148₂, capture CRC tables 150₁-150₂, processor 64, code 138 and 146, image CRC table 713 and network buffers 1114 and 1116 may operate as discussed above with regard to FIG. 12.

However, to further detect and provide the changed graphical data to the remote management system 5, the remote management controller 60E may include a capture engine 1502 that is configured to handle multiple capture buffers 148₁-148₂ and capture CRC tables 150₁-150₂. A first slice information register 1506 and a second slice information register 1508 may be implemented to identify the contents of multiple capture buffers 148₁-148₂ and capture CRC tables 150₁-150₂ to the DVR encoder engine 1510. Although only two buffers and tables are shown, it should be understood that the number of buffers and tables may be chosen based upon system performance requirements. With these multiple buffers and tables, the capture engine 132 can operate extremely efficiently and quickly to capture slices of video data. Multiple capture buffers may allow the DVR encoder engine 1510 to analyze a slice of graphical data while another slice is being captured into the alternate buffer. This may prevent the capture engine 1502 from stalling while waiting for the DVR encoder engine 1510 to finish processing a slice of graphical data. Operating in this pipelined fashion, data can be captured so quickly that it may be desirable to cease data capture and/or to cease network transmission of video data from time to time. To accomplish this, within the capture engine 1502, a throttle agent 1504 may be utilized to pause the capture engine 1502 for a predetermined period or an automatically determined period after complete frame sequences have been captured. This allows the data generated from the previous capture sequence to be transmitted periodically as complete snapshots of the frame buffer 62. The throttle agent 1504 allows complete frame sequences to occur more or less often depending on the complexity of the captured image and/or the available network bandwidth In addition, the remote management controller 60E may include a DVR encoder engine 1510 that is configured to communicate with multiple capture buffers 148₁-148₂ and capture CRC tables 150₁-150₂. Within the DVR encoder engine 1510, a first buffer descriptor register 1512 is associated with the network buffer 1114 and a second buffer descriptor register 1514 is associated with the other network buffer 1116. Each of the buffer descriptor registers 1512 and 1514 are utilized to store processed data to the network buffers 1114 and 1116. The registers 1512 and 1514 may allow the DVR encoder engine 1510 to continue to stream data to memory instead of stalling when waiting for the processor 64 to provide another network buffer 1114 or 1116. Thus, the DVR encoder engine 1510 may provide an enhanced and more efficient mechanism for handling changed graphical data.

Similar to the operation discussed above, the processor 64 may execute management code 138 and transmission code 146 to manage the multiple network buffers 1114 and 1116.

The processor 64, which may operate similar to the discussion of FIG. 12, may be configured to handle multiple packet buffers being processed in a piplelined fashion. In this embodiment, the capture engine 1502 may obtain slices of graphical data from the video graphics controller 58 and store the graphical data in the respective capture buffers $148_1$-$148_2$. Similarly, the processor 64 may utilize the transmission code 146 to communicate with the DVR encoder engine 1510 to transmit the processed data to other systems, as discussed above. The transmission code may be configured to handle communication with one or more registers, such as registers 1512 and 1514, to provide the data to the network buffers efficiently. As such, the processor 64 may be able to provide the graphical data at a faster rate that is substantially simultaneous with the video image being provided from the video graphics controller 58.

It should be noted that the capture engine 1502 and the DVR encoder engine 1510 may be configured to operate with any number of capture buffers, CRC tables, and network buffers. That is, the capture engine 1502 and the DVR encoder engine 1510 may include two, three, four or more capture buffers and CRC tables to efficiently process and provide the graphical data in a substantially simultaneous manner. For instance, the capture engine 1502 and the DVR encoder engine 1510 may be configured to operate with three capture buffers and three CRC tables. This allows the DVR encoder engine 1502 to process three slices, which may be continuous slices of the video image, without having to reduce the skipping of slices of the video frame. Further, the capture engine 1502 and the DVR encoder engine 1510 may be configured to operate with capture buffers and CRC tables that are associated with different portions of the video image. For example, the capture engine 1502 may divide the video image into three different sections with multiple slices in each section. In this manner, the capture engine 1502 may be analyzing the different slices from different sections of the video image to improve the efficiency of the remote management controller 60. Regardless, the increase in slices being processed increases the presentation rate to a substantially simultaneous rate.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A remote management controller comprising:
a video redirection device configured to:
obtain multiple separate slices of video data output from a video graphics controller,
calculate at least one value correlative to each of the multiple separate slices of video data,
if the calculated value for any portion of any of the multiple separate slices differs from a value for a previously obtained corresponding portion, update a table associated with an image related to a remote system with the calculated value, process the portion of the slice into a network packet, and move the network packet to one of multiple network buffers; and
a processor configured to:
allocate the multiple network buffers; and
facilitate transmission of the network packets loaded into the network buffers to the remote system.

2. The remote management controller, as set forth in claim 1, wherein the processor is configured to allocate one of the multiple network buffers while a first of the network buffers is being loaded by the video redirection device and while a second of the network buffers is being transmitted to the remote system.

3. The remote management controller, as set forth in claim 1, wherein the video redirection device comprises an encoder engine that moves the network packet to a second of the multiple network buffers while a first of the multiple network buffers is being transmitted to the remote system.

4. The remote management controller, as set forth in claim 3, wherein the encoder engine is configured to process the video data by compressing the video data.

5. The remote management controller, as set forth in claim 3, wherein the encoder engine is configured to process the video data by encoding the video data.

6. The remote management controller, as set forth in claim 3, wherein the encoder engine is configured to process the video data by encrypting the video data.

7. The remote management controller, as set forth in claim 1, wherein the at least one value comprises a cyclic redundancy check.

8. The remote management controller, as set forth in claim 1, wherein the video redirection device comprises a capture engine, the capture engine comprising multiple capture buffers, each capture buffer being configured to store one of the multiple separate slices of video data.

9. The remote management controller, as set forth in claim 1, wherein the video data is obtained from a direct video output of the video graphics controller.

10. The remote management controller, as set forth in claim 1, wherein the video redirection device comprises a throttle agent configured to control the capture and transmission of video data.

11. The remote management controller, as set forth in claim 10, wherein the remote management controller captures and transmits an entire screen image under control of the throttle agent.

12. A method of processing video data for transmission to a remote system, the method comprising:
obtaining multiple separate slices of video data output from a video graphics controller;
calculating at least one value correlative to each of the multiple separate slices of video data;
allocating multiple network buffers;
if the calculated value for any portion of any of the multiple separate slices differs from a value for a previously obtained corresponding portion, updating a table associated with an image related to a remote system with the calculated value, processing the portion of the slices into a network packet, and moving the network packet to one of the multiple network buffers; and
transmitting the network packet in the one of the multiple network buffers to the remote system.

13. The method, as set forth in claim 12, comprising storing each of the multiple slices of video data in a respective one of multiple capture buffers.

14. The method, as set forth in claim 12, comprising allocating one of the multiple network buffers while a first of the multiple network buffers is being loaded with the network packet and while a second of the multiple network buffers is being transmitted to the remote system.

15. The method, as set forth in claim 14, wherein calculating the at least one value comprises calculating a cyclic redundancy check.

16. The method, as set forth in claim 12, comprising throttling the obtaining and the transmission of video data.

17. The method, as set forth in claim 12, wherein obtaining the multiple slices of video data comprises obtaining the multiple slices of video data from a direct video output of the video graphics controller.

18. The method, as set forth in claim 12, wherein processing the block of video data into the network packet comprises compressing the video data.

19. The method, as set forth in claim 12, wherein processing the video data into the network packet comprises encoding the video data.

20. The method, as set forth in claim 12, wherein processing the video data into the network packet comprises encrypting the video data.

21. The method, as set forth in claim 12, comprising obtaining multiple slices of video data corresponding to an entire screen image and transmitting the entire screen image to the remote system under control of a throttling agent.

22. A computer comprising:
at least one central processing unit;
main memory accessible by the at least one central processing unit;
a video graphics controller configured to receive video data from the at least one central processing unit and to generate a video data output;
a remote management controller coupled to receive the video data output from the video graphics controller, the remote management controller comprising a video redirection device and a processor,
the video redirection device being configured to:
obtain multiple separate slices of video data output from a video graphics controller,
calculate at least one value correlative to each of the multiple separate slices of video data,
if the calculated value for any portion of any of the multiple separate slices differs from a value for a previously obtained corresponding portion, update a table associated with an image related to a remote system with the calculated value, process the portion of the slice into a network packet, and move the network packet to one of multiple network buffers; and
the processor being configured to:
allocate the multiple buffers;
facilitate transmission of the network packets loaded into the network buffers to the remote system.

23. The computer, as set forth in claim 22, wherein the processor is configured to allocate one of the multiple network buffers while a first of the network buffers is being loaded by the video redirection device and while a second of the network buffers is being transmitted to the remote system.

24. The computer, as set forth in claim 22, wherein the video redirection device comprises an encoder engine that moves the network packet to a second of the multiple network buffers while a first of the multiple network buffers is being transmitted to the remote system.

25. The computer, as set forth in claim 24, wherein the encoder engine is configured to process the video data by compressing the video data.

26. The computer, as set forth in claim 24, wherein the encoder engine is configured to process the video data by encoding the video data.

27. The computer, as set forth in claim 24, wherein the encoder engine is configured to process the video data by encrypting the video data.

28. The computer, as set forth in claim 22, wherein the at least one value comprises a cyclic redundancy check.

29. The computer, as set forth in claim 22, wherein the video redirection device comprises a capture engine, the capture engine comprising multiple capture buffers, each capture buffer being configured to store one of the multiple separate slices of video data.

30. The computer, as set forth in claim 22, wherein the slice of video data is obtained from a direct video output of the video graphics controller.

31. The computer, as set forth in claim 22, wherein the video redirection device comprises a throttle agent configured to control the capture and transmission of video data.

32. The computer, as set forth in claim 31, wherein the remote management controller captures and transmits an entire screen image under control of the throttle agent.

* * * * *

UNITED STATES PATENT AND TRADEMARK OFFICE
CERTIFICATE OF CORRECTION

| | | |
|---|---|---|
| PATENT NO. | : 7,518,614 B2 | Page 1 of 1 |
| APPLICATION NO. | : 11/210082 | |
| DATED | : April 14, 2009 | |
| INVENTOR(S) | : Theodore F. Emerson et al. | |

It is certified that error appears in the above-identified patent and that said Letters Patent is hereby corrected as shown below:

On the title page, item [56]:
On page 2, in field (56), under "U.S. Patent Documents", in column 1, line 45, below "6,003,097  A   12/1999   Richman et al."
insert -- 6,023,729  A   02/2000   Samuel et al. --.

Signed and Sealed this

Eighth Day of September, 2009

David J. Kappos
*Director of the United States Patent and Trademark Office*